US009589205B2

(12) United States Patent
Joshi et al.

(10) Patent No.: US 9,589,205 B2
(45) Date of Patent: Mar. 7, 2017

(54) SYSTEMS AND METHODS FOR IDENTIFYING A USER'S DEMOGRAPHIC CHARACTERISTICS BASED ON THE USER'S SOCIAL MEDIA PHOTOGRAPHS

(71) Applicant: Fuji Xerox Co., Ltd., Tokyo (JP)

(72) Inventors: Dhiraj Joshi, Fremont, CA (US); Francine Chen, Menlo Park, CA (US); Lynn Donelle Wilcox, Redwood City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 87 days.

(21) Appl. No.: 14/279,184

(22) Filed: May 15, 2014

(65) Prior Publication Data
US 2015/0332087 A1 Nov. 19, 2015

(51) Int. Cl.
*G06K 9/00* (2006.01)
*G06K 9/46* (2006.01)
(Continued)

(52) U.S. Cl.
CPC ........... *G06K 9/52* (2013.01); *G06F 17/3028* (2013.01); *G06K 9/00* (2013.01); *G06K 9/00288* (2013.01);
(Continued)

(58) Field of Classification Search
CPC ...... G06K 9/00288; G06K 9/468; G06K 9/52; G06F 17/3028
See application file for complete search history.

(56) References Cited

U.S. PATENT DOCUMENTS 7,912,246 B1 * 3/2011 Moon ................ G06K 9/00221
382/103
2009/0034805 A1 * 2/2009 Perlmutter ........ G06F 17/30256
382/118
(Continued)

OTHER PUBLICATIONS

Al Zamal, Homophily and Latent Attribute Inference: Inferring Latent Attributes of Twitter Users from Neighbors, Assoc. for the Advancement of Artificial Intelligence, McGill University, 2012, 4 pgs.
(Continued)

*Primary Examiner* — Kim Vu
*Assistant Examiner* — Michael Vanchy, Jr.
(74) *Attorney, Agent, or Firm* — Morgan, Lewis & Bockius LLP

(57) ABSTRACT

A method identifies user demographic characteristics, such as age and gender. First, a plurality of photos are acquired from postings to a social media site by a specific user. A plurality of facial images are identified in the acquired photos. Using a selected subset of the facial images, the method estimates one or more demographic characteristics of the user. In some cases, the estimation uses a profile photograph of the user. In some cases, the facial images are clustered based on similarity. The cluster that most closely matches the profile photo is used for demographic analysis to estimate the characteristics of the user. In some cases, a cluster is selected based on cluster purity, and the images in the cluster are used to estimate the characteristics of the user. In some cases, other self-portrait features are used, such as large facial images or arms along the perimeter of photographs.

20 Claims, 17 Drawing Sheets

(51) Int. Cl.
  G06F 17/30 (2006.01)
  G06K 9/52 (2006.01)
  G06Q 50/00 (2012.01)
(52) U.S. Cl.
  CPC ............... *G06K 9/46* (2013.01); *G06K 9/468* (2013.01); *G06Q 50/01* (2013.01)

(56) References Cited

U.S. PATENT DOCUMENTS

| | | | | |
|---|---|---|---|---|
| 2011/0115937 | A1* | 5/2011 | Sassa | G06K 9/00221 348/222.1 |
| 2011/0134247 | A1* | 6/2011 | Minegishi | G06Q 30/02 348/159 |
| 2011/0135168 | A1 | 6/2011 | Hosoi | |
| 2011/0211736 | A1* | 9/2011 | Krupka | G06F 17/30259 382/118 |
| 2011/0299764 | A1* | 12/2011 | Snoek | G06F 17/30256 382/159 |
| 2013/0304658 | A1 | 11/2013 | Zhou et al. | |
| 2015/0082172 | A1* | 3/2015 | Shakib | G06F 17/30256 715/719 |

OTHER PUBLICATIONS

Alowibdi, Language Independent Gender Classification on Twitter, IEEE/ACM International Conf. on Advances in Social Networks Analysis and Mining, Aug. 25-28, 2013, 5 pgs.
Burger, Discriminating Gender on Twitter, Association for Computational Linguistics, Jul. 27-31, 2011, 9 pgs.
Caruana, Ensemble Selection from Libraries of Models, Dept. of Computer Science, Cornell University, Proceedings of the 21st International Conference on Machine Learning, 2004, 9 pgs.
Chen, What's in a Name? First Names as Facial Attributes, IEEE Conference on Computer Vision and Pattern Recognition, 2013, 8 pgs.
Deitrick, Gender Identification on Twitter Using the Modified Balanced Winnow, Communications and Network, 2012, 7 pgs.
Demers, The Top 7 Social Media Marketing Trends That Will Dominate 2014, Forbes, Sep. 24, 2013, 4 pgs.
Dolor, SocialBarrel, Are Teens Now More Hooked on Image-Centric Social Networks? [Infographic], Oct. 17, 2013, 7 pgs.
Frey, Clustering by Passing Messages Between Data Points, Dept. of Electrical and Computer Engineering, www.sciencemag.org, vol. 315, Feb. 16, 2007, 20 pgs.
Guan, Text Clustering With Seeds Affinity Propagation, IEEE Transactions on Knowledge and Data Engineering, vol. 23, No. 4, Apr. 2011, 11 pgs.
Halstead, Photo Centric Social Networks are Looking Good for Business, MoreVisibility, Feb. 24, 2012, 2 pgs.
Humphrey, 'Selfies,' Those Much-Maligned Self-Portraits, are Changing the Way we Communicate, Star Tribune (Minneapolis), Oct. 13, 2013, 4 pgs.
Jones, Statistical Color Models With Application to Skin Detection, International Journal of Computer Vision 46(1), 81-96, 2002, 16 pgs.
Kong, Inferring Anchor Links Across Multiple Heterogeneous Social Networks, University of Illinois at Chicago, Oct. 27-Nov. 1, 2013, 10 pgs.
Lazebnik, Beyond Bags of Features: Spatial Pyramid Matching for Recognizing Natural Scene Categories, 2006, IEEE Computer Society Conference on Computer Vision and Pattern Recognition (CVPR'06), 2006, 13 pgs.
Liu, What's in a Name? Using First Names as Features for Gender Inference in Twitter, Analyzing Microtext: Papers from the 2013 AAAI Spring Symposium, School of Computer Science, McGill University, 2013, 7 pgs.
Lodi, Digital Photography Review, Twitter Taking Photo-Centric Turn, Nov. 16, 2012, 2 pgs.
Naphade, On the Detection of Semantic Concepts at TRECVID, IBM Thomas J. Watson Research Center, MM'04, Oct. 10-16, 2004, 8 pgs.
Nguyen, "How Old Do You Think I Am?": A Study of Language and Age in Twitter, Proceedings of the Seventh International AAAI Conference on Weblogs and Social Media, Association for the Advancement of Artificial Intelligence, 2013, 10 pgs.
Rao, Classifying Latent User Attributes in Twitter, Dept. of Computer Science, Johns Hopkins University, SMUC'10, Oct. 30, 2010, 8 pgs.
Schwartz, PLOS One, Personality, Gender, and Age in the Language of Social Media: The Open-Vocabulary Approach, Sep. 2013, vol. 8, Issue 9, 16 pgs.
ScienceDaily, Facebook Data Used to Predict Users' Age, Gender and Personality Traits, University of Pennsylvania, Sep. 26, 2013, 3 pgs.
Snoek, Early Versus Late Fusion in Semantic Video Analysis, ISLA, Informatics Institute, University of Amsterdam, Nov. 6-11, 2005, 4 pgs.
Wang, Locality-Constrained Linear Coding for Image Classification, 2010, 8 pgs.
Yadegaran, Are Selfies Good or Bad for Our Self-Esteem?, MercuryNews.com, Dec. 11, 2013, 4 pgs.
Zafarani, Connecting Users Across Social Media Sites: A Behavioral-Modeling Approach, Computer Science and Engineering, Arizona State University, Aug. 11-14, 2013, 9 pgs.

* cited by examiner

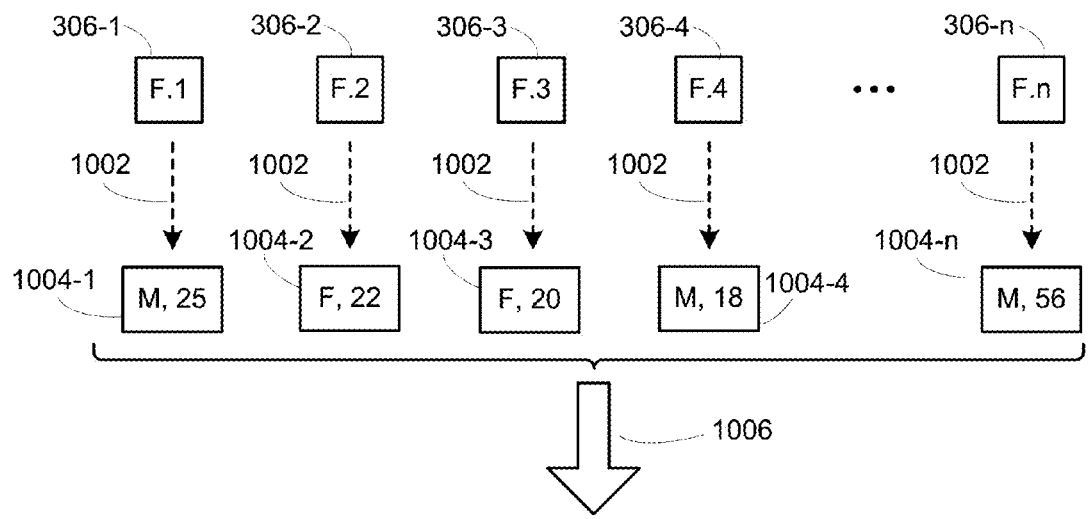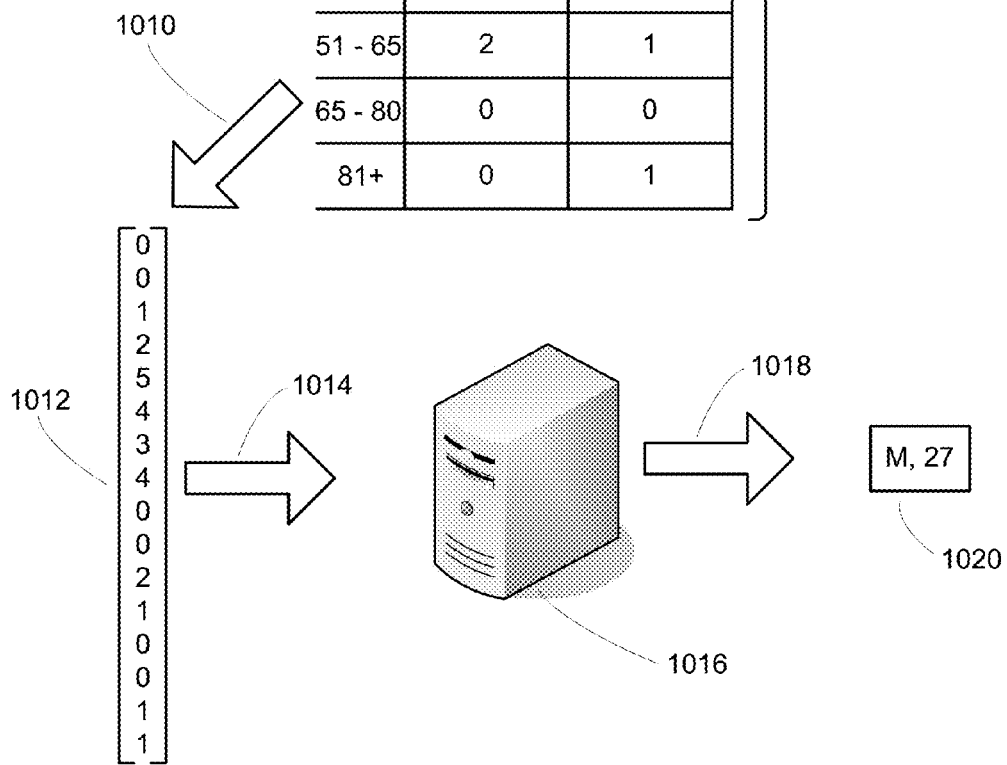
Figure 10

Figure 14C

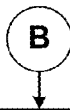

1410 — Estimate one or more demographic characteristics of the user based on a selected subset of the facial images (continued).

1448 — Apply N distinct evaluation methods to the facial images, each method identifying a respective set of facial images that are estimated to be images of the user. N is an integer greater than one.

1450 — Combine the identified respective sets of facial images to form a candidate set of facial images.

1452 — For each facial image in the candidate set:

1454 — Form a respective N-dimensional feature vector, where each dimension of the respective feature vector corresponds to a unique one of the evaluation methods, and the values in the respective feature vector indicate which of the evaluation methods estimate the respective facial image to be an image of the user.

1456 — Use the respective feature vector as input to a trained classifier to estimate whether the respective facial image is an image of the user.

1458 — The selected subset of the facial images includes facial images determined by the trained classifier to be images of the user.

1460 — Apply a plurality of evaluation methods to the facial images, each method identifying a respective set of facial images that are estimated to be images of the user.

1462 — Combine the identified respective sets of facial images to form a candidate set of facial images.

1464 — Score each facial image in the candidate set using a weighted average of scores provided by the evaluation methods.

1466 — The selected subset of the facial images includes facial images whose weighted average scores exceed a predefined threshold value.

SYSTEMS AND METHODS FOR IDENTIFYING A USER'S DEMOGRAPHIC CHARACTERISTICS BASED ON THE USER'S SOCIAL MEDIA PHOTOGRAPHS

TECHNICAL FIELD

The disclosed implementations relate generally to demographic classification, and more specifically to classification using photographs.

BACKGROUND

Microblog platforms (such as Twitter®) have become the voice of millions of users on the web today. Microblogs are somewhat different from traditional social networks in terms of shorter posts by users and a more open ecosystem. Although microblogs have historically focused on text-based messages, some now support images and videos. At the same time, some social networks are dedicated to photographs or videos. Posting photos has become easier with smartphones, and sometimes photos convey more information than text.

One trend in social multimedia is taking self-portraits, which are sometimes referred to as "selfies." With the introduction of front facing cameras in smartphones, taking selfies has become especially easy.

From a business standpoint, microblogs can be a good source of marketing information that enables recommendations for products/advertisements to be directed to the right people. There are some advantages of focusing on users who are active on microblogs, including: (1) microblogs are generally more dynamic in their content and people tend to actively discuss current issues; and (2) microblog data is more accessible, especially for third parties.

A business application may associate social sentiment on current or happening topics with social demographics. For example, if a company is watching sentiment on a new product launch, or a political group has made an announcement, the company can find out more quickly what people think on the microblogs. If there are user profiles for the users (created explicitly by each user or developed implicitly from user activity), the company can evaluate what different demographic groups think. However, demographic information about users is not always available.

SUMMARY

The present application describes novel ways to infer demographic characteristics about users based on the photographs that users post to social media sites, such as microblogs or social networks. In some instances, the process identifies a set of self-portrait photograph ("selfie") images from the posted photographs, then analyzes the selfie images to estimate the demographic characteristics (such as age and gender) of each user. A social media site is also referred to as a "social network." Some social media sites are commonly referred to as "microblogs" when the focus is on small postings. The techniques described herein may be applied to any social media site, with particular applicability to microblog sites.

The disclosed techniques are valuable even for a social media site where a user profile specifies demographic information, because the user-specified information is not necessarily accurate. In some cases, users specify incorrect profile information in order to protect their privacy, to appear older or younger than they really are, or for other reasons.

The disclosed techniques are also valuable regardless of whether the user has provided a profile photo. In some cases, the profile photo is inaccurate or not representative of the user. In addition, some profile photos have low resolution, so estimating demographic characteristics based on the user's digital photos may be more accurate.

Cues from a user's photographs posted in a microblog enable estimating the user's age and gender. In addition to using posted photographs, some implementations use the profile photo of the user or profile photos of the user obtained from other social network accounts (e.g., as listed by the user in the current microblog account). If photographs posted by the user to other social media sites are publically available, they can be combined with the user's current microblog photographs to make demographic estimates.

While some implementations focus on analyzing a person's microblogged photos to determine age and gender of the person, the same techniques can be applied in other contexts where there are multiple photographs associated with a user. For example, in some instances, a smart TV may have access to a user's photos on a smartphone. These photos can be used to gauge the user's age and gender and thus target appropriate advertisements. Some smart TVs are now equipped with a camera that can be used to intelligently record videos of people watching the TV at different times. A summary estimate of each person's age and gender could be used for targeted advertising adaptively at different times of day. In the context of TVs, the notion of a user could be: (i) the person syncing his/her phone with TV; or (ii) the persons watching TV at different times (and thus there can be multiple users of one TV).

With the surge of multiple social networks and people maintaining accounts in many of them, it would be useful to map user accounts across the different networks. The ability to estimate age, gender, or other demographic characteristics (such as ethnicity) of users could improve the matching process.

Problems around social media data mining have focused on making inferences about people who participate in a network based on what/where/who they post. In the absence of sufficient microblog text, a user's posted photos can provide useful cues for determining age, gender, or other demographic characteristics. This information can be used for performing demographic specific recommendation of ads, products, movies, services, travel, and so on.

Some implementations analyze a user's posted photos to make estimations about the person's age and gender. In some implementations, other demographic characteristics, such as ethnicity, are estimated as well. People's pictures, when analyzed collectively, may give important cues that identify a person's age and gender. For example, presence of young children in many pictures may indicate that the user is a parent or a grandparent. The presence of a lot of teens or young adults in the pictures may indicate that the user is a teen or young adult. The presence of selfies facilitates the age/gender prediction process.

Scene or concept detection in pictures may also be indicative of a user's age or gender, particularly when applied collectively (e.g., multiple photographs or multiple scenes or concepts detected). For example, if a user's photos contain pictures of clothes, perfumes, or nail-polish, the user is more likely to be female. If a user's photos have sports pictures, the user is more likely to be male. While concept-related cues may not be enough to predict age or gender alone, they may be useful in combination with face-based inferences, such as identifying male or female features in selfie images. It is also possible to compare a user's profile picture to their posted photos to assist in estimating age and gender. Note that a single profile photo alone may not provide a good estimate of age and gender. For example, a profile photo may be old, may have poor image quality, may be an image other than the person (such as a cartoon or stick figure), or may include additional people.

In some implementations, demographic inferences made using photographs are combined with text-based demographic inferences (when available) to increase the accuracy or confidence for the inferences.

In some implementations, a user's photos are obtained from a microblog. and face detection is applied to each photo to identify zero or more facial images in each photo. Face detection can be performed using various software, such as the OpenCV face detector. In some implementations, the faces are then clustered using visual features that are discriminative of faces. Some implementations use locality-constrained linear coding (LLC) to represent faces. In the LLC framework, each face is represented by a 21504 dimension vector (1024 dimensional code for each of 21 spatial pyramid grids). This is followed by computation of a similarity matrix consisting of similarity values between faces using a spatial pyramid matching framework. The computed similarity matrix is then used to detect visual clusters of faces. In some implementations, Affinity Propagation is used to perform face clustering. Affinity propagation is an iterative clustering algorithm based on the concept of message passing between data points. Whereas many clustering algorithms require the number of clusters to be pre-determines, Affinity Propagation does not have that requirement. This can be particularly useful for face clustering within a user's microblog photo collection, because computing the number of clusters (e.g., distinct people) beforehand is not easy. Cues from a user's profile photo can be used to identify selfies. Face detection is also performed on the user's profile photo, if there is one. If the profile photo is a human face, several methods can be used to identify if a particular cluster is a "selfie" cluster.

Some implementations perform a visual similarity check on all clusters using the face detected in the profile photo. If the similarity between the profile face and most faces in a given cluster is above a threshold value, the cluster as identified as a selfie-cluster. In some implementations, this step includes computing LLC features for the profile face and using spatial pyramid matching to compute similarity values between the profile face and all faces in all computed clusters. This can then be used to compute the average similarity value between the profile face and a given cluster. Clusters can then be ranked by their average profile similarity scores. A higher value represents faces more similar to the profile face. In some implementations, the threshold similarity value is computed using a controlled experiment with a few users (e.g., 20, 50, or 100 users) and their tagged selfie clusters. In some implementations, human participants are asked to look at faces in clusters and their corresponding similarity scores (similarity to the profile face) to determine an appropriate threshold based on visual judgment.

Some implementations use the face detected in the profile photo as a seed to perform clustering of faces in the user's collection. If a prominent cluster is found, it is identified as a selfie-cluster. Specifying a seed is a way to initialize cluster centers in order to guide a clustering algorithm. The seed values are given higher importance for being cluster centers during the clustering process. In some implementations, a modified version of Affinity Propagation is applied, which incorporates initialization with seeds.

Some implementations use a clustering algorithm, and use multiple techniques to select the best cluster. As noted above, one of the techniques is matching to a profile photo. Another technique used by some implementations is the size of the clusters. Sometimes the largest cluster is a selfie cluster. In addition, some implementations select a cluster based on cluster purity. Purity can be measured in various ways, and represents how similar the images are within a cluster. A "perfect" cluster would have all of the facial images being identical. When the images in a cluster are not very similar to each other, the cluster has low purity. Some implementations use combinations of these techniques to identify the best cluster (or clusters). In some implementations, each of the techniques computes a score for each cluster, and the scores are combined using a weighted average.

Some implementations use a visual search instead of visual clustering. The visual search uses the face detected in the profile photo, which is compared to each of the faces detected in the user's photo collection. Facial images that have a similarity score higher than a threshold can be candidates for selfies. Some implementations for visual search compute LLC features for the profile photo and each facial image, then compute similarity values between profile face and facial images in user's photos using spatial pyramid matching. A threshold similarity value is selected as a cut-off value for detecting selfie-candidates. Some implementations use a controlled experiment with a few users (e.g., 10 users or 100 users) and their tagged selfie candidates. In some implementations, human participants are asked to look at faces ranked by their similarity scores (similarity to the profile face) to determine an appropriate threshold based on visual judgment.

In some implementations, more than one method is used for identifying selfie clusters. This information can be consolidated or combined in various ways. Some implementations construct a union set of estimated selfies from the multiple methods. Some implementations form an n-dimensional feature vector for each facial image, where n is the number of distinct evaluation methods. For each facial image, the values in the corresponding feature vector represent the estimations that the facial image is a selfie based on each of the evaluation methods. In some implementations, the values in the feature vector are either 0 (not a selfie) or 1 (is a selfie). In some implementations, the values of the feature vectors indicate a probability that the facial image is a selfie, and can be any value between 0 and 1. In some implementations, some of the evaluation methods are binary (values are 0 or 1), and other evaluation methods are continuous (e.g., values between 0 and 1). The feature vectors can then be used within a classification framework to classify each photo as a selfie. For example, the classification network may use machine learning, such as a support vector machine (SVM) or a neural network.

In some implementations, the feature vectors are computed only for facial images that have a threshold likelihood of being selfies. In some implementations, a facial image is included only if at least one of the evaluation methods identifies it as a selfie. This method is commonly used when each of the methods produces a binary output (yes or no). For an evaluation method that produces a probabilistic output, some implementations set a threshold lower bound to be declared a "candidate," and a facial image is included in the final processing only when it is a candidate based on at least one of the evaluation methods.

In some implementations, each of the separate evaluation methods computes a probability or score for each of the facial images, and the probabilities or scores are combined in various ways. For example, scores may be combined using a weighted average. In some implementations, the weights are assigned based on historical information indicating the accuracy of each method. In some implementations, a computed combined probability or score is compared to a threshold value to make the final determination of whether a facial image is a selfie. In some implementations, the combined probability or score is computed only for the candidate facial images, as described above with respect to feature vectors.

When users do not have profile photos or the profile photos do not have faces (i.e. no face is detected), some implementations check if the users have listed other social media accounts in their profile. Some implementations then obtain an appropriate profile photo from the other designated social media. Some implementations infer the profiles of users in other social networks and obtain profile photos if available. Some implementations identify and use profile photos from other social media even when a profile photo is available on the microblog site. These additional profile photos can be combined with the user's microblog photos to determine the user's age and gender. In addition, the posted photos on other social media may be combined with the photos from the microblog site to increase the data. When more than one profile photo is available, they can all be used as multiple seeds for clustering faces to obtain a selfie cluster.

In addition to profile photos, there are other ways to identify selfie photos or selfie clusters. Typically a selfie is taken with the camera held at arm's length. Therefore, the face in a selfie may occupy a large percentage of the photo. Other selfie features or indicators include the presence of a partially showing arm or the absence of landscape. Skin detection has been studied in the field of computer vision. Methods can be used to detect presence of skin along the boundaries of a photo to indicate possible presence of arms. Additionally, a classifier (such as support vector machines) can be trained to recognize possible locations of skin pixels in selfies. Some implementations use other camera parameters associated with close-up photographs to identify selfies.

Once one or more selfie images are identified, age and gender can be estimated based on facial appearance. There are typically multiple facial images identified as selfies, so a collective vote is taken to estimate the age and gender of the user.

In addition to estimating age and gender using a selfie cluster or selfie candidates, some implementations estimate age and gender for all of the faces in the user's posted photos. Some implementations form a distribution of estimations over age and gender categories. For example, some implementations divide age into a set of ranges, and for each (age range, gender) category, a sum is computed for the number of facial images estimated to be in that category. This distribution into demographic segments is a feature vector that is used as input to a supervised classification scheme based on machine learning (e.g., a support vector machine or a neural network). That is, the age and gender of the user is estimated based on the distribution of ages and genders of the people in the user's photos. Some implementations combine this estimation method with the other methods based on selfies.

Some implementations use visual concept detection on a user's posted photos to identify certain age or gender related concepts. When scene or concept detection is applied collectively on multiple photos, it can be useful to identify a user's age or gender. For example, if a user's photos indicate a school or college setting, the user is likely a teenager or young adult. If a user's photos indicate travel to tourist destinations, the user is more likely to be a little older. In order to learn a concept or scene based age or gender classifier, some implementations use a controlled set of users and apply visual concept detectors to their photographs. Next, a feature vector of concept distributions is created for supervised classification for age and gender estimation. Note that visual concept detection can range from a single item (e.g., the detection of a football indicating some likelihood or being male) to many items (e.g., images from many different tourist destinations indicating likelihood of being older).

Some implementations address the fact that the correlation between visual concepts and demographic characteristics differs based on other factors, such as geographic location. For example, the visual concept indicators for people in California may be different from visual concept indicators in other parts of the United States or other countries. Some implementations address this issue by partitioning the data into designated subgroups, and performing the analysis of each user based on the relevant subgroup.

In some implementations, multiple methods are applied to detect a selfie cluster or set of selfie images. As noted above, some implementations combine the data using "early fusion." In this way, the outputs of the various methods are placed into a feature vector, and the combined feature vector is used by a classifier to determine the final result. Some implementations use "late fusion." In this way, some implementations combine scores given by different classifiers using a weighted approach, and make a final determination based on the combined score.

Some implementations use a greedy forward selection based approach for a late fusion classifier. This technique learns weights for different classifiers based on their classification performance on a validation dataset (with known ground truth). In other words, a classifier's prediction is trusted based on its performance (e.g., performance on a carefully constructed validation set). In order to learn effective classifier weights, some implementations construct a validation set from a controlled set of users. In some implementations, the weights are updated over time as additional data is collected as to how well each classifier performs.

In accordance with some implementations, a process identifies user demographic characteristics. The process is performed at a computing device with one or more processors, and memory storing one or more programs for execution by the one or more processors. The process acquires a plurality of photos posted to a social media site by a user, then identifies a plurality of facial images in the acquired photos. The process estimates one or more demographic characteristics of the user based on a selected subset of the facial images.

BRIEF DESCRIPTION OF THE DRAWINGS

FIG. 10 is a process flow illustrating another method for identifying user demographic characteristics using a user's photos in accordance with some implementations.

FIGS. 14A-14C illustrate a process for identifying user demographic characteristics in accordance with some implementations.

Like reference numerals refer to corresponding parts throughout the drawings.

DESCRIPTION OF IMPLEMENTATIONS

Figure 1:
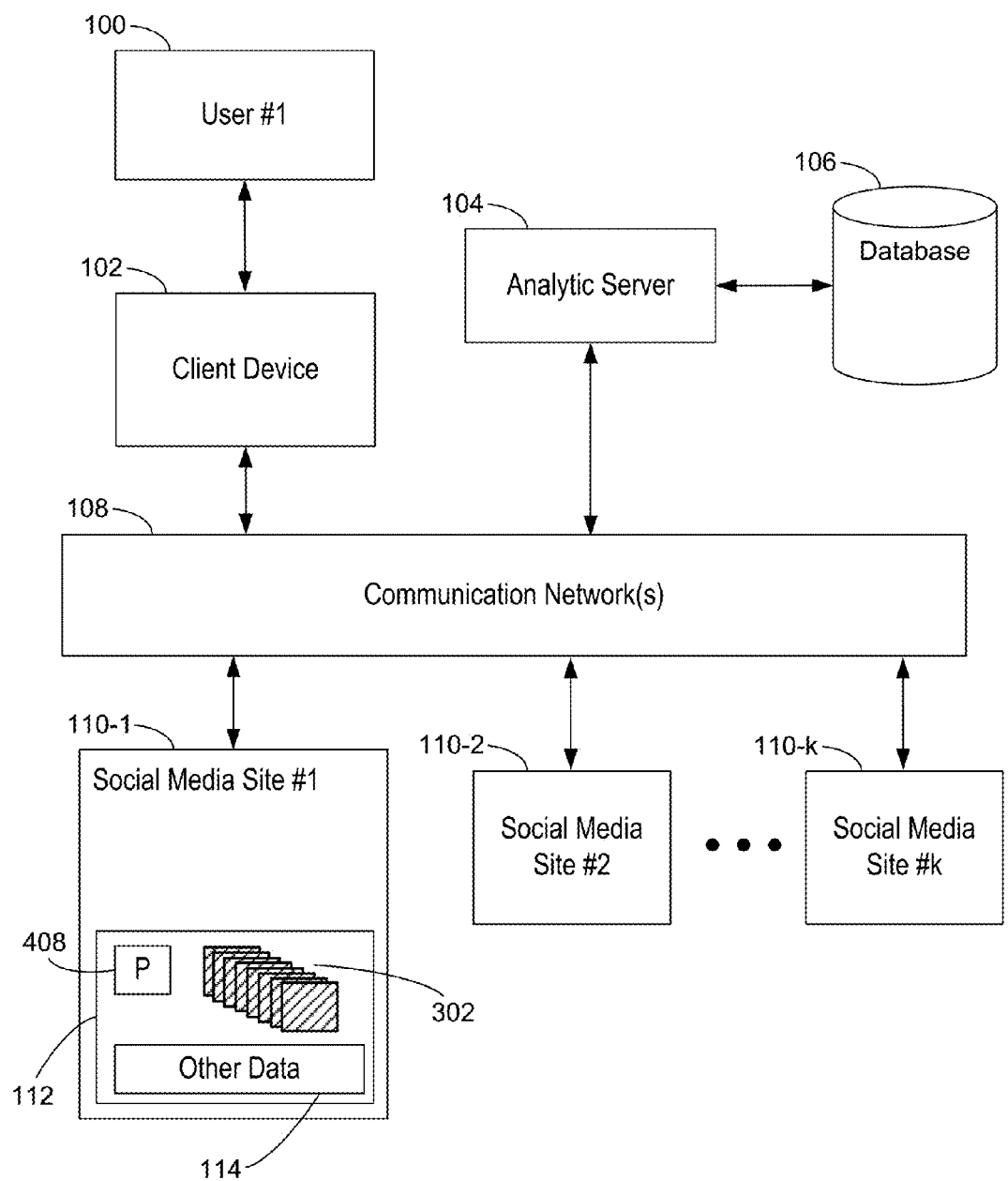
FIG. 1 illustrates a context in which some implementations of the present invention operate.

FIG. 1 illustrates a context in which some implementations of the present invention operate. In FIG. 1, a user 100 interacts with a client device 102. For example, the user 100 may use an image sensor 1300 on the device 102 to capture photographs 1330. In some cases the user 100 uploads some of the photographs 1330 to a social media site 110-1 using a social media application 1326, or social media web application 1324. The client device 102 communicates with the social media site 110-1 over a communication network 108, which may include the Internet, local area networks, and so on.

The social media site 110-1 stores some information 112 corresponding to the user 100, such as a profile photo 408, other photographs 302 uploaded by the user 100, and other data 114, such as text-based messages, video, a user profile, account information, and so on. As illustrated in FIG. 1, there are many distinct social media sites 110, including sites 110-2, ... , 110-k. A user 100 may upload photographs and/or a profile photo to these other social websites as well.

In some cases, some of the user information 112 is made available publicly, and is thus accessible by an analytic server 104, which may be operated by a third party not associated with a social media site 110. In some implementations, the analytic server extracts some information (e.g., photographs 302), and analyzes the information. In some implementations, the extracted or computed data is stored in a database 106, such as a SQL database, one or more CSV files, one or more XML files, or cloud storage.

Figure 2:
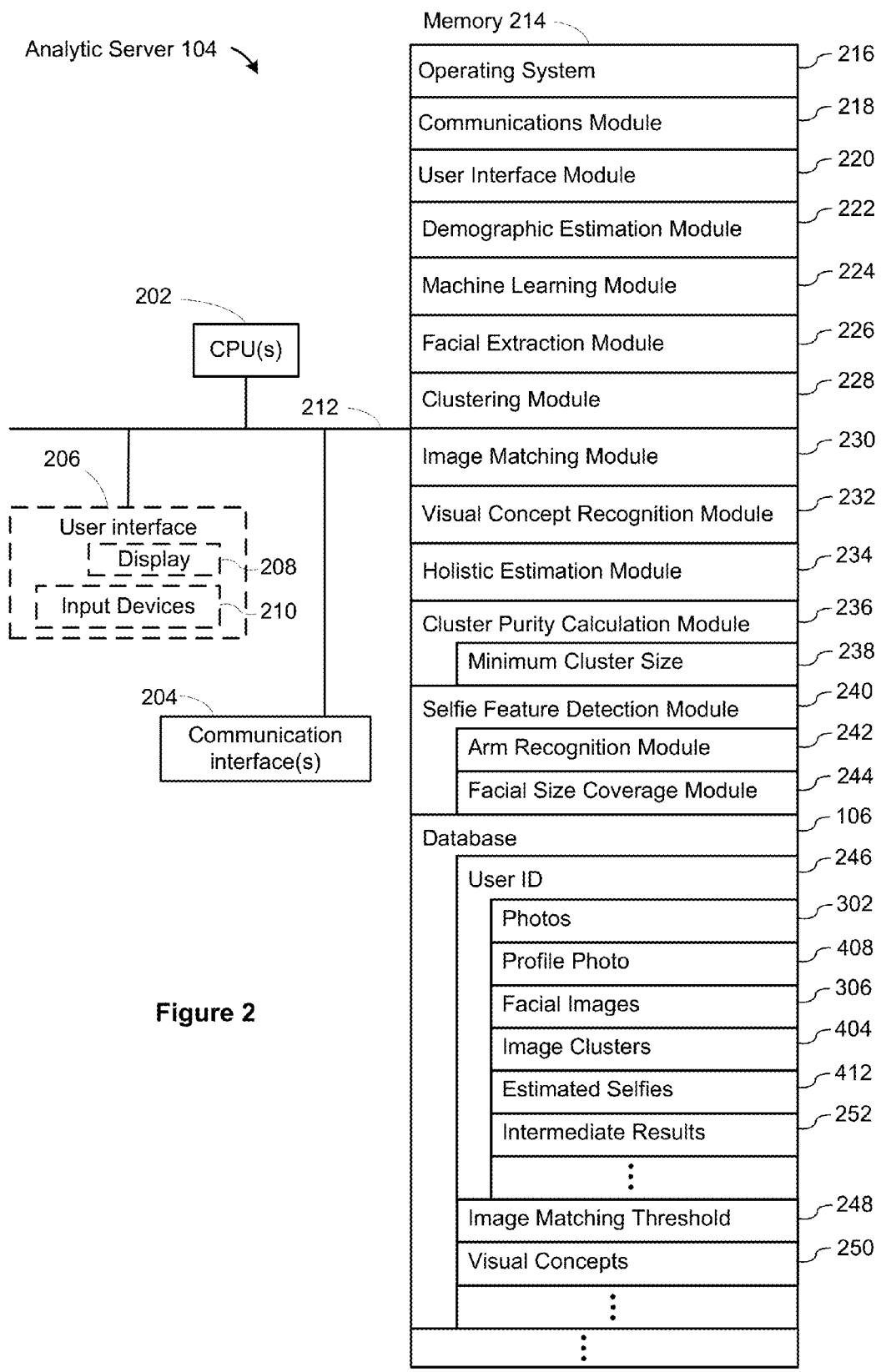
FIG. 2 is a block diagram illustrating an analytic server in accordance with some implementations.

FIG. 2 is a block diagram illustrating an analytic server 104, according to some implementations. The analytic server 104 typically includes one or more processing units (CPU's) 202, one or more network or other communications interfaces 204, memory 214, and one or more communication buses 212 for interconnecting these components. The communication buses 212 may include circuitry (sometimes called a chipset) that interconnects and controls communications between system components. The analytic server 104 may include a user interface 206 comprising a display device 208 and input devices 210 (e.g., keyboard, mouse, touch screen, keypads, etc.). Memory 214 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may optionally include one or more storage devices remotely located from the CPU(s) 202. Memory 214, or alternately the non-volatile memory device(s) within memory 214, comprises a non-transitory computer readable storage medium. In some implementations, memory 214 stores the following programs, modules, and data structures, or a subset thereof:

- an operating system 216, which includes procedures for handling various basic system services and for performing hardware dependent tasks;
- a communication module 218, which is used for connecting the analytic server 104 to other computers via the one or more communication interfaces 204 (wired or wireless) and one or more communication networks 108, such as the Internet, other wide area networks, local area networks, metropolitan area networks, and so on;
- an optional user interface module 220, which receives commands from the user via the input devices 210 and generates user interface objects in the display device 208;
- a demographic estimation module 222, which uses photographs 302 posted by a user 100 to a social media site 110 to estimate various demographic characteristics of the user, such as age and gender. The demographic estimation module invoke various other modules or procedures, as described below;
- a machine learning module 224, which implements one or more machine learning algorithms, such as a support vector machine or a neural network. Typically the machine learning is supervised, using historical data for both the inputs and outputs in the training The machine learning module may be applied in various ways, as illustrated and described with respect to FIGS. 10 and 11;
- a facial extraction module 226, which identifies facial images 306 within photographs 302. This is described below with respect to FIG. 3;
- a clustering module 228, which implements a clustering algorithm on the facial images 306. In some implementations, the clustering module 228 uses one or more seed images to begin the clustering (e.g., one or more profile photos 408). One of skill in the art recognizes that there are various alternative clustering algorithms, such as Affinity Propagation, hierarchical clustering, K-means, distribution-based clustering, and density-based clustering;
- an image matching module 230, which matches individual pairs of images as well as matching an individual image to clusters. In some implementations, the image matching module uses visual features based on locally-constrained linear coding (LLC), with similarity measured by spatial pyramid matching. In some implementations, image matching computes a similarity score between pairs of images and designates them as a match when the similarity scores exceeds a specified threshold score 248;

a visual concept recognition module 232, which identifies one or more visual concepts or scenes 250 stored in a database 106. This is described in more detail below with respect to FIG. 9;

a holistic estimation module 234, which estimates demographic characteristics for each of the facial images 306 for a user, and uses that information as input to a trained classifier (e.g., using machine learning) to estimate the demographic characteristics of the user 100. This is described in more detail below with respect to FIG. 10;

a cluster purity calculation module 236, which can be effective even in the absence of the profile photo 408. After facial images 306 have been clustered, the cluster purity module computes the "purity" of each cluster, and estimates that the cluster with the best purity is a selfie cluster. The cluster purity calculation module 236 is described in more detail below with respect to FIGS. 7A and 7B. In some implementations, a minimum cluster size 238 is used to avoid selecting a small cluster (e.g., a "cluster" of 1 image) that has high purity solely because it is small;

a selfie feature detection module 240, which is configured to identify facial images 306 or photographs 302 that include self-portrait features or indicia. In some implementations, the selfie feature detection module 240 includes submodules configured to identify specific features, such as an arm recognition module 242 or a facial size coverage module 244. These modules are described in more detail with respect to FIGS. 8A and 8B;

a database 106, which includes data for various users 100. For each user, the database includes a unique identifier, such as a user ID 246. Associated with each user ID 246 are photos 302, a profile photo 408, a set of facial images 306 extracted from the photos 302, one or more sets of image clusters 404, a set of estimates selfies 412, and various intermediate results 252 of the calculations. In some cases, not all of these items are saved, and some implementations store additional data elements. In some implementations, the database stores an image matching threshold 248, which is used to determine whether a pair of images are identified as a match. In some implementations, the database stores a set of visual concepts 250, which are used by the visual concept recognition module 232.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 214 may store a subset of the modules and data structures identified above. Furthermore, memory 214 may store additional modules and data structures not described above.

Although FIG. 2 shows an analytic server 104, FIG. 2 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement an analytic server 104 and how features are allocated among them will vary from one implementation to another, and may depend in part on the amount of data traffic that the system must handle during peak usage periods as well as during average usage periods.

Figure 3:
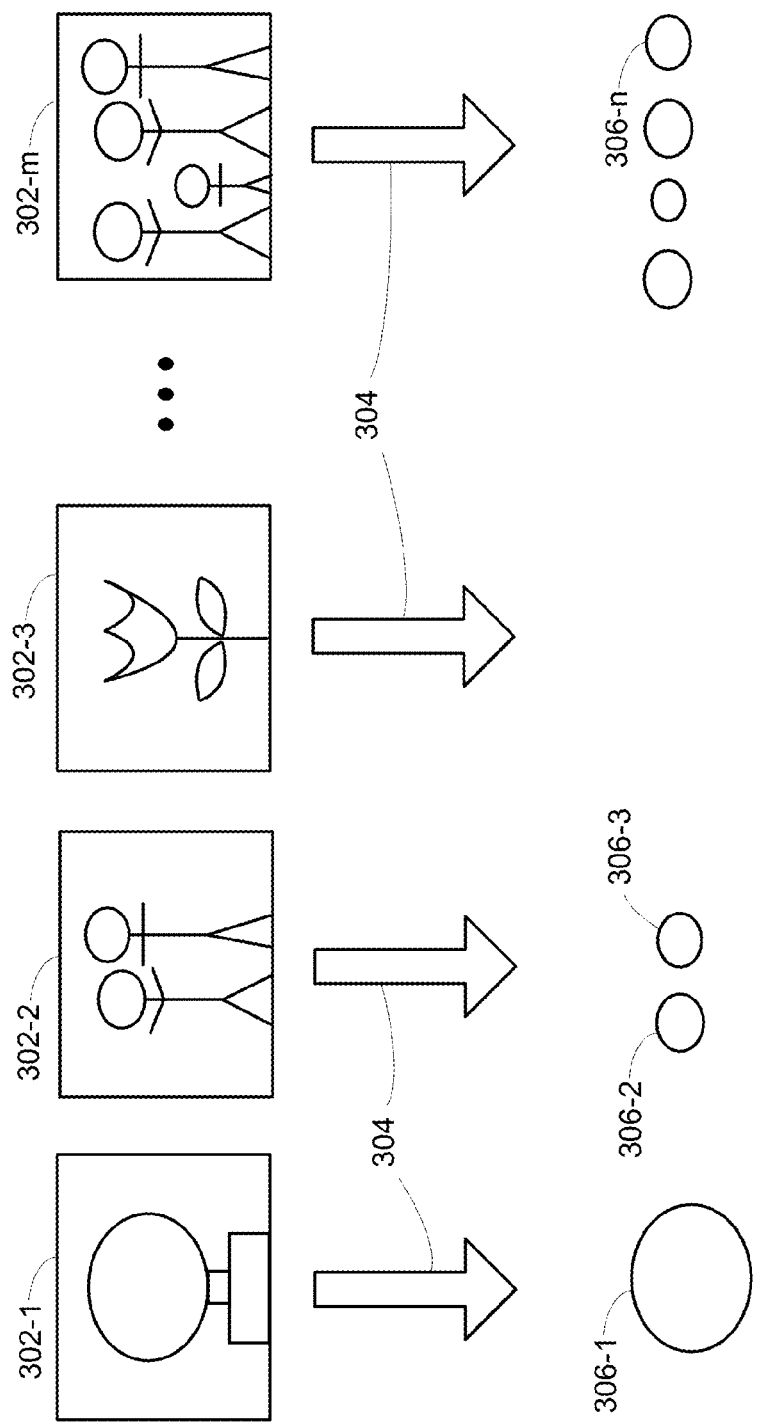
FIG. 3 illustrates a process of extracting facial images from photographs in accordance with some implementations.

FIG. 3 illustrates a process that extracts 304 facial images 306 from a user's uploaded photographs 302. In some cases, all of the photos 302 are retrieved from a single social media site 110, but in other cases the photos 302 are retrieved from 2 or more social media sites 110. In some implementations, when photos are retrieved from two or more social media sites 110, identical images are eliminated. When a profile photo 408 is available, the facial extraction process 304 is applied to the profile photo 408 as well. Face detection can be performed using various software, such as the OpenCV face detector. As illustrated in FIG. 3, a single photograph 302 can have any number of facial images 306. In this illustration, Photo 302-3 is a flower, which has no facial images 306. Photo 302-1 is a close up of a single person, so one facial image 306-1 is extracted (304). Photo 302-2 is a pair of people, so two facial images 306-2 and 306-3 are extracted (304). In the final photo 302-m, there are four people, so four facial images 306 are extracted, including 306-n. In this figure there are m photographs 302 and n facial images 306, where n and m are positive integers. In some cases n is greater than m, particularly when many of the photos have multiple faces. On the other hand, if there are a lot of photos of scenery without people, m could be greater than n.

Figure 4:
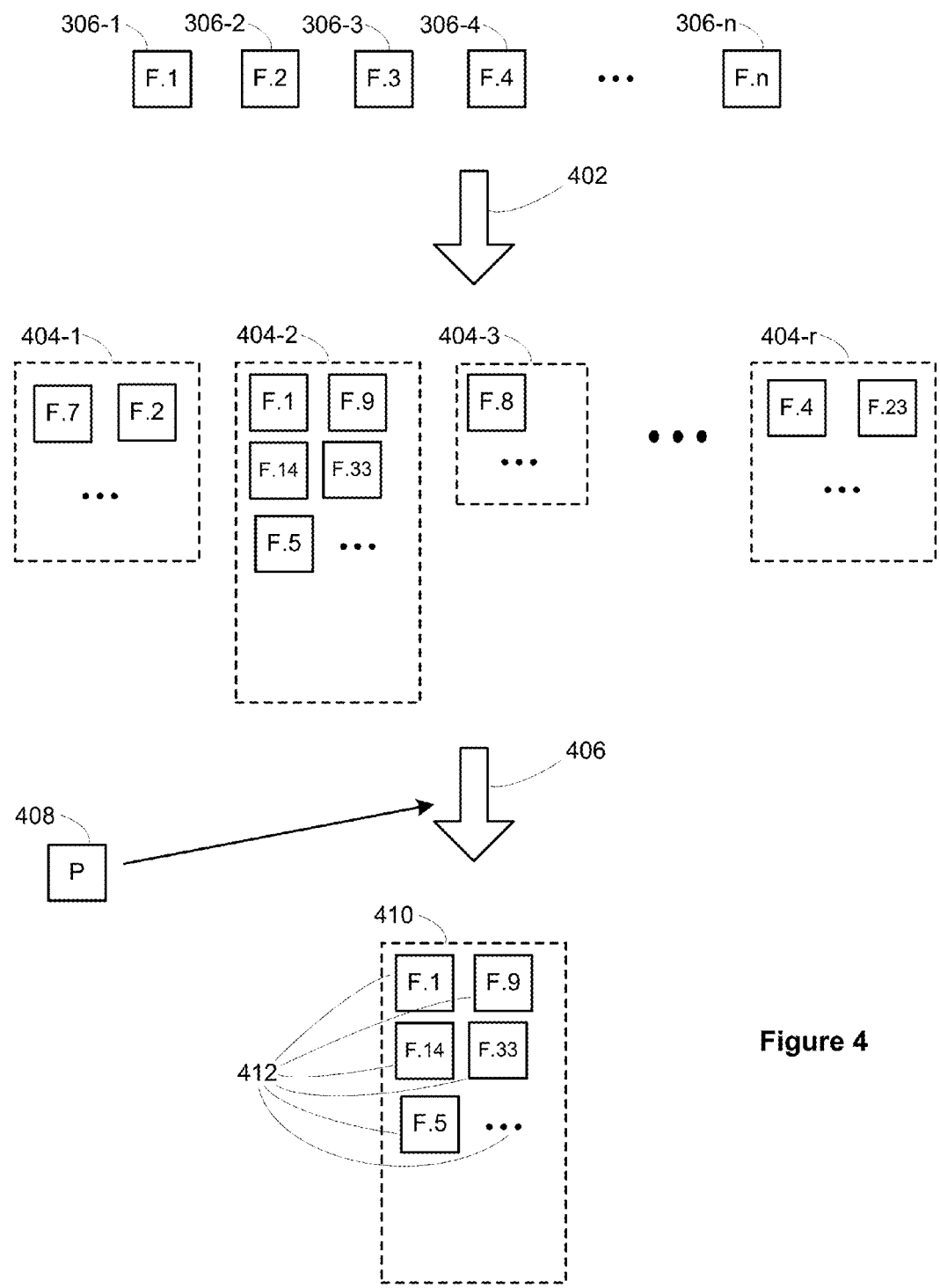
FIG. 4 is a process flow illustrating a first method for identifying user demographic characteristics using a user's photos in accordance with some implementations.
Figure 5:
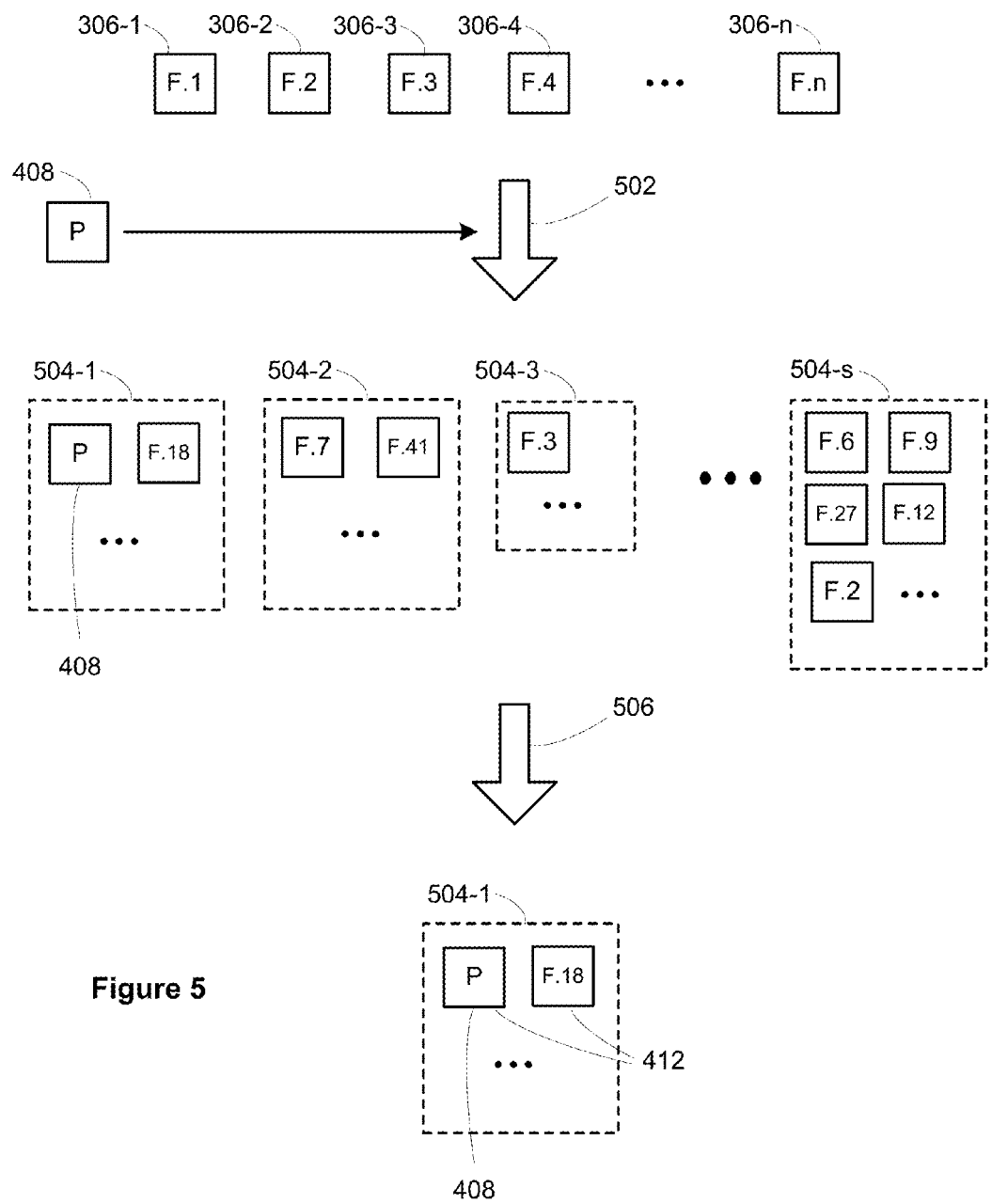
FIG. 5 is a process flow illustrating a second method for identifying user demographic characteristics using a user's photos in accordance with some implementations.

FIGS. 4 and 5 illustrate two ways of identifying self-portraits using a clustering algorithm on the facial images 306 extracted from the user's photographs 302. Both FIG. 4 and FIG. 5 use a user's profile photo 408, but use it in different ways. In some instances, there is a single profile photo extracted from the social media site 110 where the user's photos 302 are stored. In some instances, when a photo is not available from one social media site, linked social media sites 110 are checked. For example, on one social media site, the user 100 may post a link to one or more accounts on other sites 110. In some implementations, linked social media sites 110 are checked even when a profile photo is available from the first social media site 110-1. In this case, there may be more than one profile photo. Throughout this discussion, references to "the" profile photo 408 includes the case where there are multiple profile photos. When the profile photos at different social media sites are identical, some implementations remove the duplicates.

In order to cluster facial images 306 together, there must be some notion of "distance" or similarity between two images. Some implementations use facial features based on locality-constrained linear coding. In some implementations, each face is represented by a feature vector with 21,504 dimensions, which includes 1024 codes for each of 21 spatial pyramid grids. In this context, spatial pyramid matching can be used to compute a similarity score between any pair of images. Other implementations use proprietary facial recognition systems or other similarity measures. Some implementations use Hough Transforms to identify or compare facial features.

One of skill in the art recognizes that there are various alternative clustering algorithms that may be applied here, such as Affinity Propagation, K-means, or a hierarchical clustering algorithm. Some of the clustering algorithms require a pre-selected number of clusters. Others, such as Affinity Propagation, do not require a preselected number of clusters. Some agglomerative clustering algorithms build the clusters from the bottom up (start with singleton clusters and iteratively combine), whereas some divisive clustering algorithms have a top down approach, starting with a single cluster that contains everything, then dividing to form clusters where the elements (facial images 306) are closer together.

The clustering process 402 builds some clusters 404, which may vary in size, as illustrated in FIG. 4. Here, there are r clusters 404-1, 404-2, 404-3, . . . , 404-r, where r is an integer less than n. Note that even with clustering there may be some singleton clusters. In practice, each cluster is expected to represent images of a single person. Note that there may be more than one cluster corresponding to one person. For example, a person may take some selfies with a front view and other selfies with more of a profile view. These may show up as different clusters. In some instances, other factors may affect grouping as well, such as hairstyle.

Figure 12:
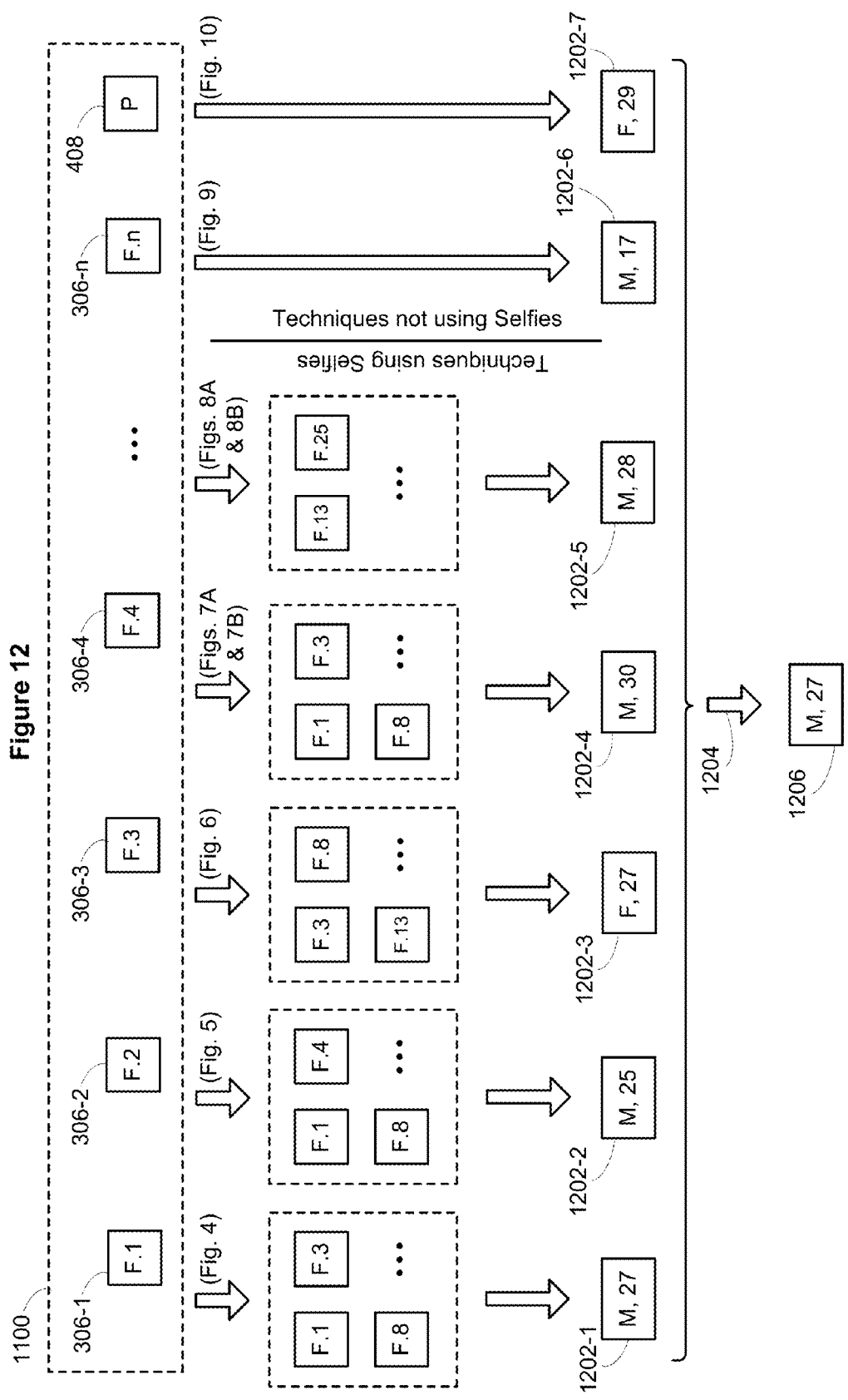
FIG. 12 illustrates a process for combining multiple techniques to identify the demographic characteristics of a user in accordance with some implementations.

In FIG. 4, each of the clusters 404 is compared (406) to a profile photo 408 to identify one or more selfie clusters. The comparison 406 typically uses the same distance or similarity measure used in the clustering process. In some implementations, identifying a selfie cluster is achieved by computing the distance between each facial image 306 in a cluster and the profile photo 408, and taking the average. In some implementations, if the average distance of the profile photo to images in a cluster is less than a threshold value, the cluster is identified as a selfie cluster. In some implementations, a minimum cluster size is required in order to be considered. The result of the comparison is to identify one or more selfie clusters 410. The facial images in the selfie cluster 410 are identified as selfie images 412. As illustrated in FIG. 12 and the flowchart in FIGS. 14A-14C, the selfies 412 are used to estimate the demographic characteristics of the user. For example, the age and gender for the selfie images 412 can be estimated individually, then averaged. In some implementations, a confidence value is also computed. For example, if 3 selfie images suggest that a person is male and 3 other selfie images suggest than the person is female, there is no confidence about the person's gender. On the other hand, if all six selfies estimate that the user is female, then there is fairly high confidence of the result. Various techniques to estimate age, gender, and ethnicity may be applied.

FIG. 5 is similar to FIG. 4, but the profile photo 408 is used as a seed in the clustering process. This can produce different results because the profile seed may develop a cluster that centers around it, which may result in a more accurate selfie cluster. This is particularly useful for a clustering algorithm that builds clusters from the bottom up. After the clusters are built (502), it is easy to identify one selfie cluster—it is the cluster that contains the profile photo 408. However, there may be multiple selfie-clusters. In some implementations, another cluster (or clusters) is identified as a selfie cluster when the average distance between images in the cluster and the profile photo is less than a threshold value. In this illustration, the selfie cluster is cluster 504-1. The other clusters 504-2, 504-3, . . . , 504-s are not identified as selfie clusters. Note that the number of clusters here is not necessarily the same as the number of clusters in FIG. 4. By using the profile 408 as a seed, there may be different clusters.

Similar to FIG. 4, the facial images in the identified selfie cluster are identified as selfies, and the demographic characteristics of the user are estimated based on those selfies.

Figure 6:
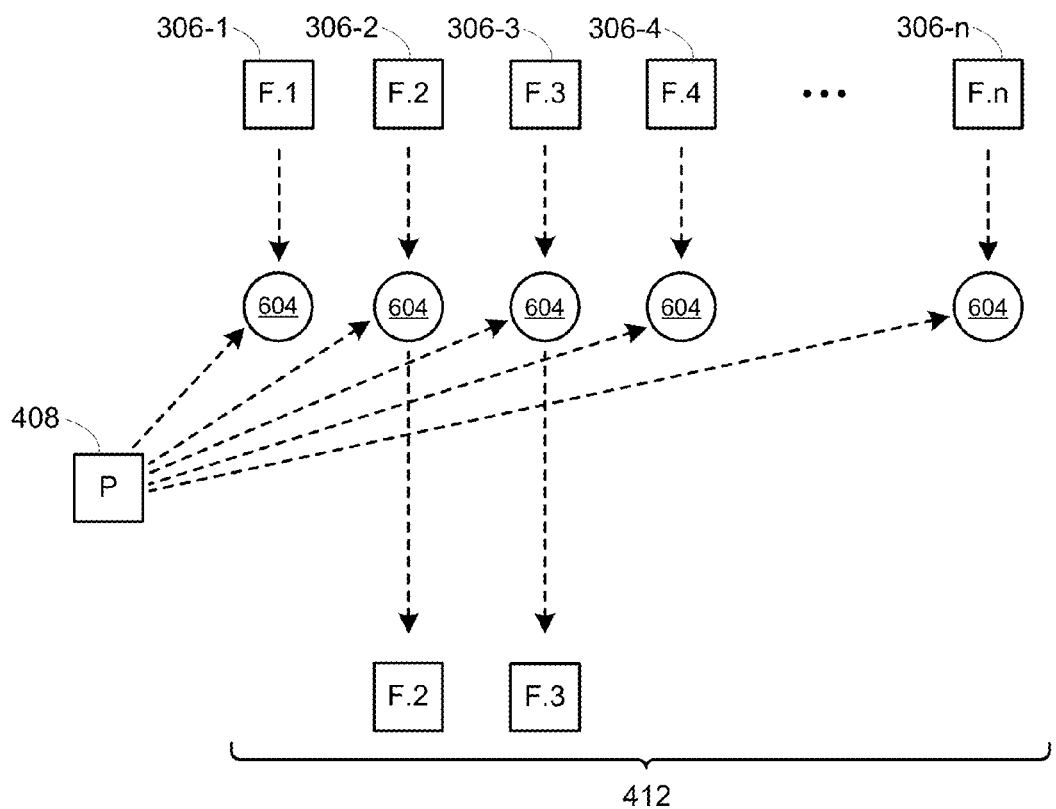
FIG. 6 is a process flow illustrating a third method for identifying user demographic characteristics using a user's photos in accordance with some implementations.

FIG. 6 illustrates a process of identifying selfies individually, without clustering. Using this method, each of the facial images 306 is compared (604) to the profile photo 408, and if the similarity score exceeds the image matching threshold 248, the facial image is identified as a selfie. When more than one profile photo is available, each facial image 306 can be compared to each of the profile photos, and if any of the similarity scores exceeds the threshold 348, the image 306 is declared to be a selfie. In FIG. 6, facial images 306-2 and 306-3 match the profile photo 408 (e.g., similarity score greater than threshold 248), but the other facial images do not match. Therefore, images 306-2 and 306-3 are identified as selfie images 412. Once these selfie images 412 are identified, the demographic characteristics of the user can be estimated as described above with respect to FIG. 4.

Figure 7A:
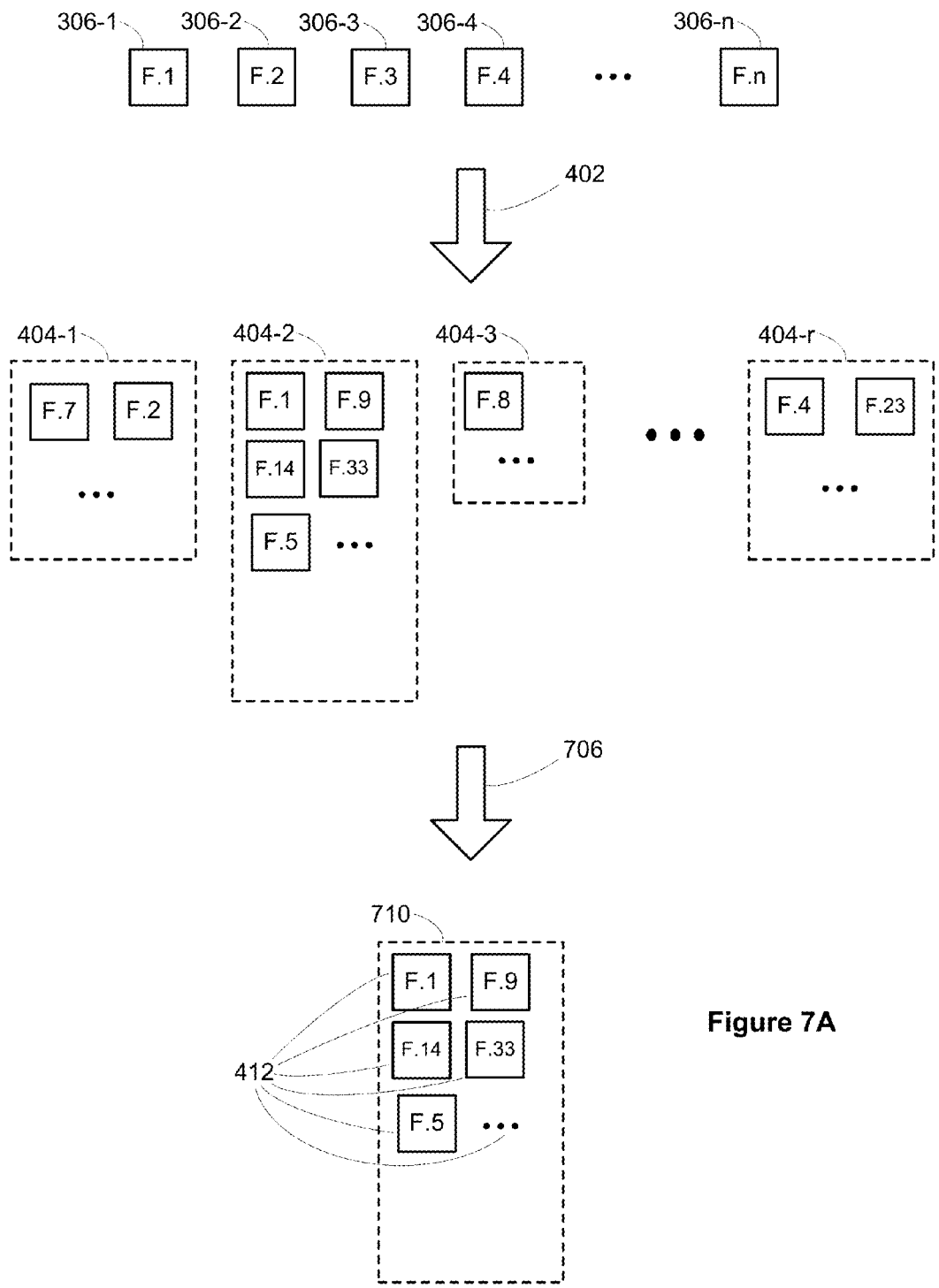
FIGS. 7A and 7B illustrate a fourth method for identifying user demographic characteristics using a user's photos in accordance with some implementations.
Figure 7B:
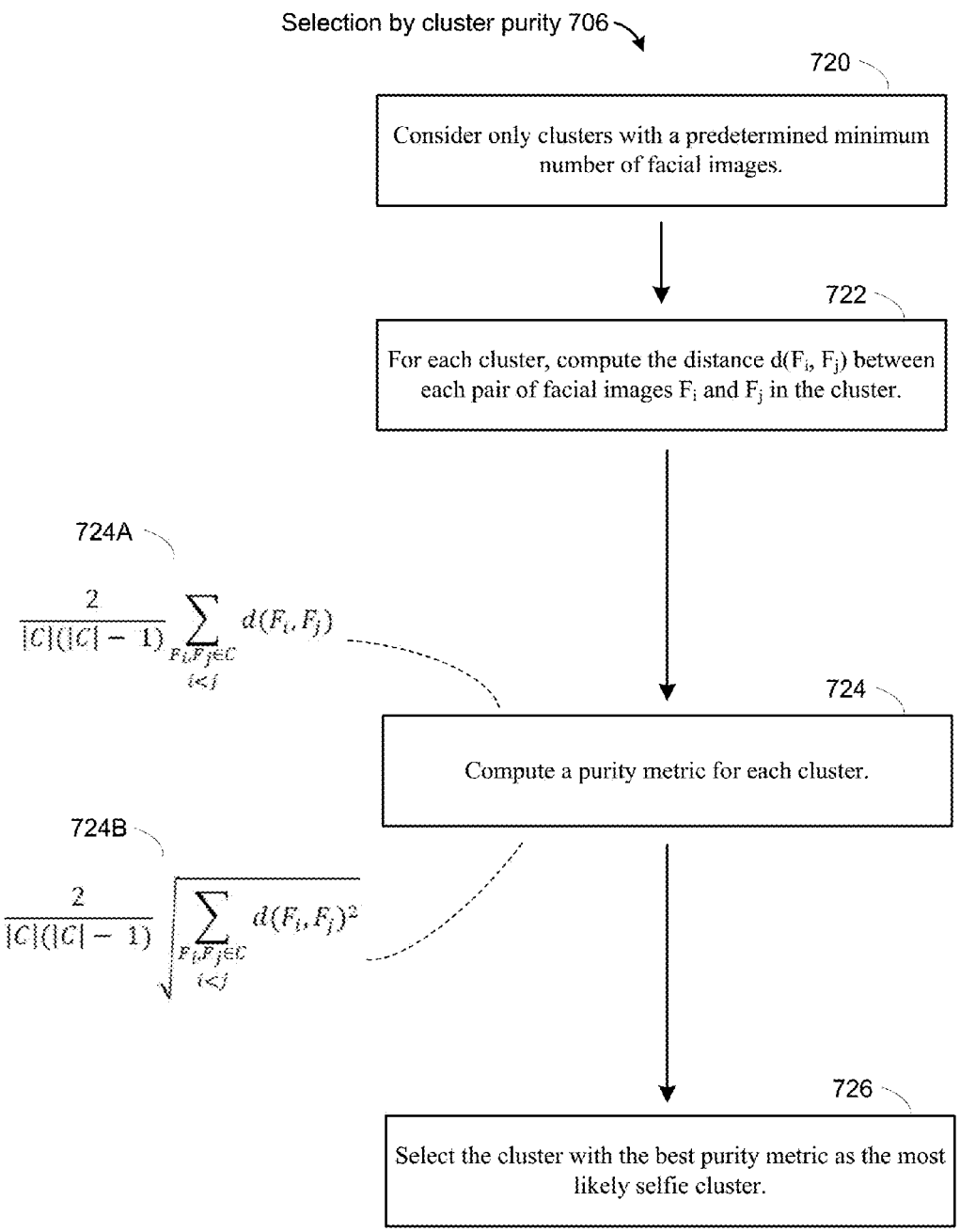

FIGS. 7A and 7B illustrate a process similar to FIG. 4, but can be used even when no profile photo 408 is available. The idea is that a selfie cluster may have the highest purity, or greatest similarity between images in the cluster.

As illustrated in the top part of FIG. 7A, building the clusters is the same as in FIG. 4. After building (402) the clusters, the best cluster 710 is selected (706) based on a purity calculation, and the images 306 in the cluster 710 are identified as selfies 412. As in FIGS. 4, 5, and 6, the selfies are used to estimate the demographic characteristics of the user 100.

A process for identifying the best cluster is illustrated in FIG. 7B. In some implementations, purity is measured by computing the average distance between the images 306 in each cluster. In some implementations, distance is computed as the reciprocal of the similarity score between two images. For example, if a similarity score ranges from 0 to 1, with 1 representing a perfect match, then the reciprocal also ranges from 0 to 1, but approaches 0 as the similarity approaches 1. Minimizing the total distance between images 306 is one estimate of purity.

In some implementations, selection by image purity (706) evaluates (720) only clusters with a minimum size 238. In some implementations, the minimum size is 2 or 3. In particular, this avoids declaring a singleton cluster to be a "perfect" cluster. In some implementations, the first step is to compute (722) the distances between each of the facial images in each of the clusters. Note that in some implementations, this information can be retained from the clustering algorithm 402. That is, as distances (or similarities) are computed for clustering, the data is saved for later use for cluster purity analysis. Using the computed distances, there are multiple ways that a purity metric can be computed (724) for each cluster. In some implementations, the cluster purity is the mean average of all the distance calculations in each cluster, as illustrated in equation 724A. A pure cluster has a low average distance between images. Some implementations use the purity metric in equation 724B, which computes the square of each distance, and computes the square root of the overall sum. In practice, equation 724B places a higher penalty on large distances. Once the purity metric is computed, the best cluster (or best clusters) is selected as the most likely selfie cluster.

The nature of selfies leads to some specific photo characteristics that can identify them. Some implementations use these characteristics, either as a separate method of identifying selfies, or in conjunction with the other methods described above to improve their accuracy. For example, some implementations use selfie features to help identify a selfie cluster.

Figure 8A:
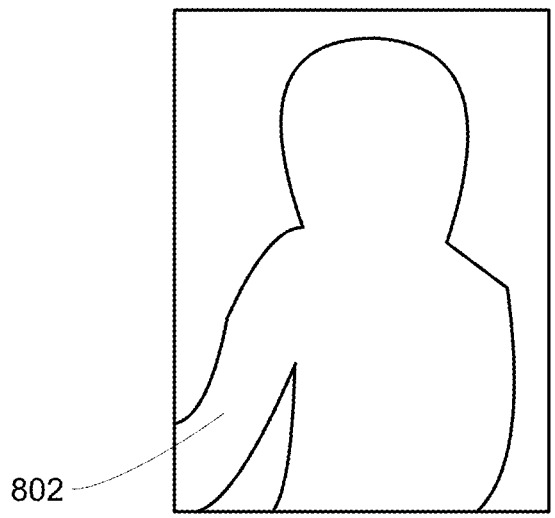
FIGS. 8A and 8B illustrate techniques for identifying user demographic characteristics using selfie features in accordance with some implementations.

As illustrated in FIG. 8A, a selfie commonly shows a user's arm 802 along the perimeter of the photo. An arm along the perimeter is much less common when a photo is taken of someone else. In some implementations, a selfie feature detection module 240 or arm recognition submodule 242 can apply techniques to identify human skin around the border of a photo. Some implementations use a classifier (such as a support vector machine) to recognize possible locations of skin pixels around the perimeter.

Figure 8B:
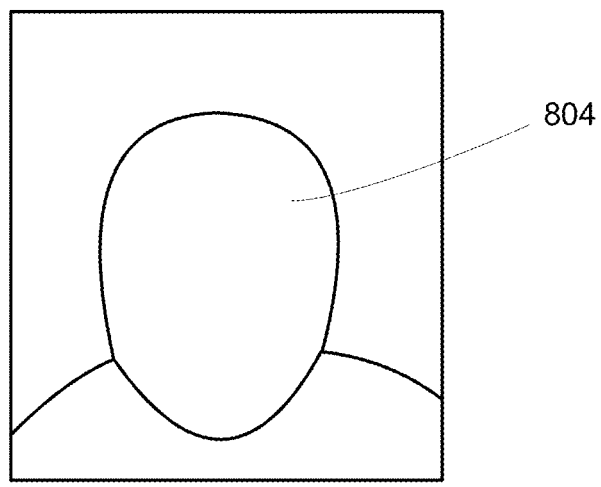

As illustrated in FIG. 8B, another common characteristic of selfies is that the face 804 represents a large percentage of the photograph. A selfie feature detection module 240 or facial size coverage submodule 244 can set a threshold percentage coverage (e.g., 25%), and when an identified face 804 in a photo exceeds that threshold, the photo is tentatively identified as a selfie.

Note that the characteristics in FIGS. 8A and 8B can be combined. An image with a large face and an arm may be even more likely to be a selfie. In some implementations, selfie features are binary (e.g., a facial image either does or does not have a specific selfie feature). In some implementations, selfie features are continuous (e.g., computing a probability that a facial image is a selfie). In some implementations, various characteristics that may indicate a selfie are tracked independently (e.g., arm along perimeter and facial size coverage). In some implementations, each of the characteristics is referred to as a "feature." In some implementations, multiple characteristics are combined to compute a single score (e.g., compute a single score based on 5 distinct characteristics that may indicate a selfie photograph). In some implementations, the combined characteristics are referred to as a "feature." In some implementations, values are computed for each implemented selfie characteristic, and the values are used as an input feature vector to a classifier that has been trained on historical data.

Figure 9:
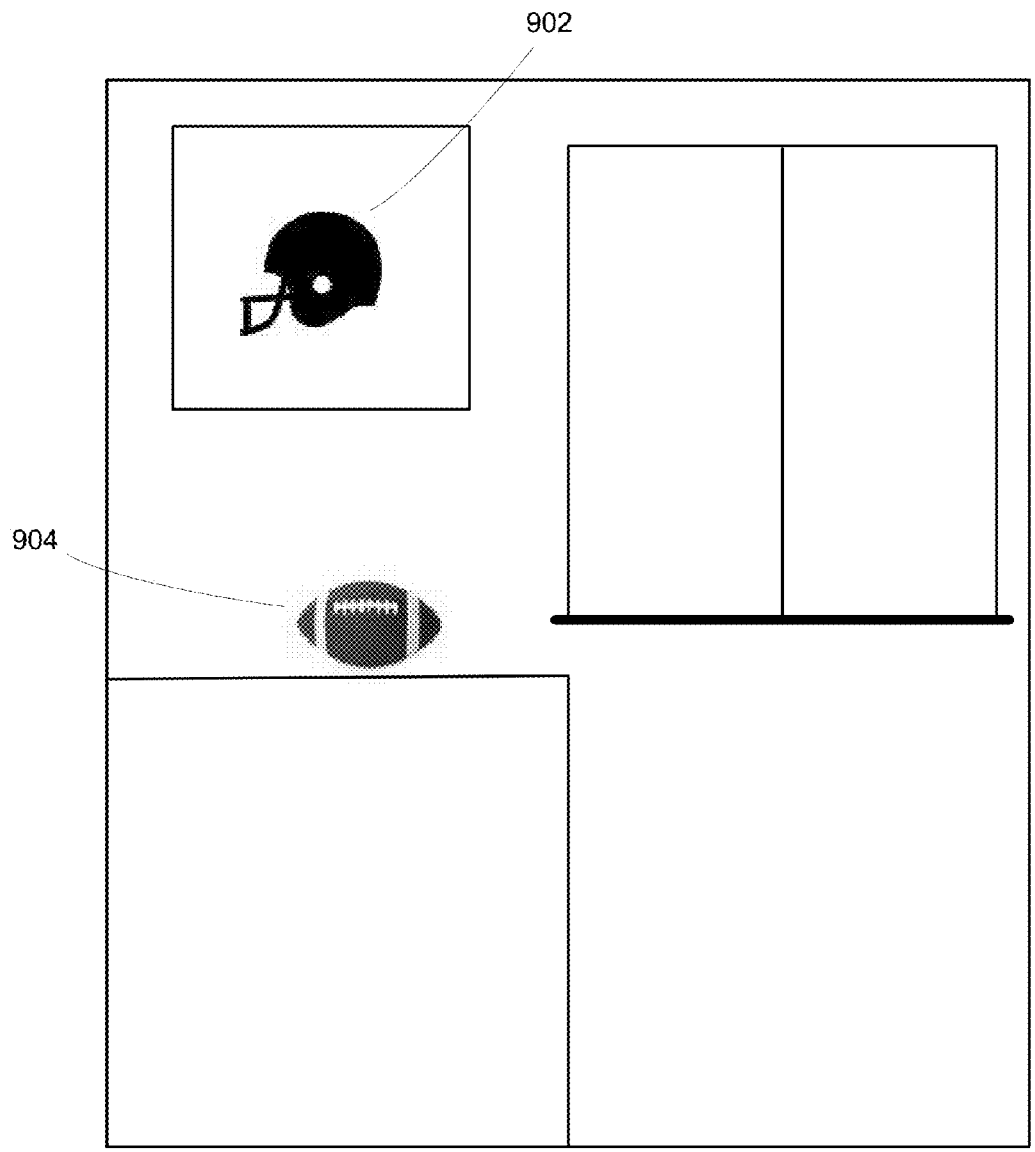
FIG. 9 illustrates a process for identifying user demographic characteristics based on visual concepts or scenes in accordance with some implementations.

FIG. 9 illustrates how the visual concept recognition module 232 uses elements of a photograph other than human faces to identify demographic characteristics of a user. The database 106 stores a set of visual concepts 250, which include concepts that are helpful to identify demographic characteristics. For example, many ordinary objects, such as a pencil or a chair are not very likely to help identify the age, gender, or ethnicity of a user. On the other hand, some concepts do have a correlation with age, gender, or ethnicity. In FIG. 9, a photograph has an image of a football helmet 902 and a football 904, which could be matched to saved visual concepts 250. These two items, particularly in conjunction, are more indicative of a male user. They are also indicative of an American user, which could be useful if nationality or geographic location are demographic characteristics being determined.

In FIG. 9, both of the concepts 902 and 904 appear in the same photograph, but this is not required. Some implementations search for visual concepts throughout a user's photographs and combine all of the identified concepts for demographic estimation. For example, a user's photos may include photos of different national parks, a variety fine desserts, an array of women's clothes, or other such identifiable items.

In some implementations, the identified concepts in the user's photos 302 are used to create an input vector for a trained classifier. For example, each visual concept 250 corresponds to a dimension in the vector, and the number of times that concept is found in a user's photos is used as the value for that dimension. In some implementations, the values are normalized to account for users with different numbers of photos. Using a sampling of individuals and their photos (e.g., 100 people), a classifier can be trained to correlate demographic characteristics with the concepts in a user's photographs. In some implementations, the training process is also used to identify which concepts are the most useful at distinguishing the demographic characteristics of users. In some implementations, the number of visual concepts actually used is 100, 200, 500, or 1000. When processing speed is not critical, some implementations use additional visual concepts 250.

FIG. 10 illustrates an approach that estimates the demographic characteristics for some or all of the facial images 306, then estimates the demographic characteristics of the user based on those estimates. In other words, estimate the characteristics of a user based on the user's photos of family, friends, and selfies, but without specifically identifying any of the photos as selfies. In some implementations, this approach is performed by a holistic estimation module 234. In some implementations, the holistic estimation module 234 estimates demographic characteristics for all (or most) of the facial images 306. This may be suitable when the number of facial images 306 is small (e.g., 20 or 30). When the number of facial images is larger (e.g., 100 or more), some implementations take a sample of the facial images and compute the demographic characteristics for the facial images in the sample. In some implementations, the sample is required to exceed a fixed percentage of the total (e.g., at least 50% or at least 25%). In some implementations, the sample set must be statistically significant (e.g., 95% confidence that the results for the sample represent the results for the entire set). In some instances, a sample of 30 or 50 facial images may be sufficient to reasonably estimate the demographic characteristics for a set of 1000 facial images. In this way, a substantial number of the facial images are used to build the distribution.

As illustrated in FIG. 10, the holistic approach begins by estimating (1002) the demographic characteristics corresponding to the facial images 306. This can use any known techniques. In this example, the facial images 306-1, 306-2, 306-3, 306-4, . . . , 306-n result in the n estimations 1004-1, 1004-2, 1004-3, 1004-4, . . . , 1004-n. In some cases, if an estimate is inconclusive for a specific facial image, that image is omitted from further processing for this approach. In this example, the demographic characteristics include just age and gender, but the same methodology can be applied to other sets of demographic characteristics as well. As noted above, if the set of facial images is large, the process may select a sample of the facial images and compute the demographic characteristics for the facial images in the sample (i.e., a substantial number of the facial images).

The holistic estimation module 234 then builds (1006) a distribution 1008 of the estimates, broken down into segments based on the demographic characteristics. In this illustration, there are eight age ranges, but implementations may use more or fewer ranges, or adapt the sizes of the ranges. For example, it may be more important to have smaller ranges for young adults. In some implementations, when the data will be used later for targeted advertising, the age ranges needed for the targeted advertising are used for the estimation. In some implementations, the data in the distribution 1008 is normalized to account for the number of photos that each user has. For example, divide each number by the total number of facial images so that the sum of all the distribution entries is one. The data in the distribution is then used to build (1010) a feature vector 1012, which is used as input (1014) to a trained classifier 1016. The classifier is trained based on a sample of users and their photographs. Using the input feature vector 1012, the trained classifier 1016 outputs (1018) an estimate (1020) of the demographic characteristics of the user. In this example, the estimate 1020 is a gender and a specific age, but in some implementations the estimate is gender and an age range (e.g., one of the age ranges used in the distribution 1008).

Figure 11:
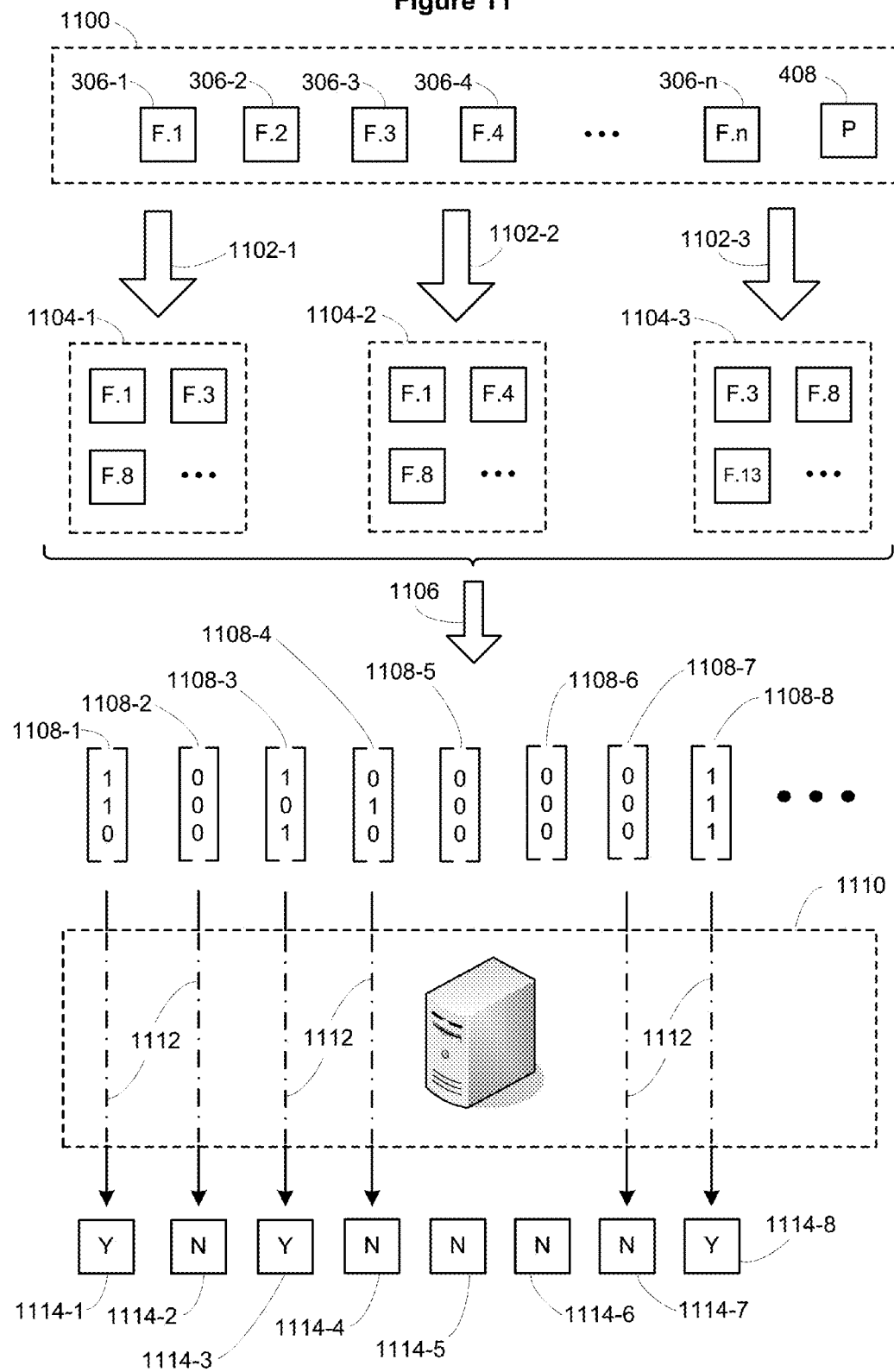
FIG. 11 illustrates combining multiple methods that identify selfie photographs in accordance with some implementations.

As illustrated above, many different techniques may be applied to identify the demographic characteristics of a user. Some implementations combine one or more of these techniques, which can produce more accurate results or provide greater confidence in the generated estimates. FIGS. 11 and 12 illustrate two ways that the techniques can be merged.

In FIG. 11, the techniques that identify selfies are combined to create a better estimate of which photos are actually self-portraits. In this illustration, three independent techniques 1102-1, 1102-2, and 1102-3 are independently applied to the image set 1100, and each technique identifies its own estimated set of selfies 1104-1, 1104-2, and 1104-3. These could be any techniques, such as the techniques illustrated in FIGS. 4, 5, 6, 7A/7B, 8A, 8B, or 9.

Each of the independent techniques is associated with a dimension in a set of feature vectors 1108 that are constructed (1106) from the selfie sets 1104-1, 1104-2, and 1104-3. For each facial image, a feature vector 1108 is created (1106), and the elements of the feature vector indicate which of the techniques estimated the image as a selfie. For example, the first facial image F.1 (306-1) was estimated to be a selfies by the first two techniques 1102-1 and 1102-2, but was not identified as a selfie according to the third technique 1102-3. Therefore, the corresponding feature vector 1108-1 is [1, 1, 0]. In some implementations, the values are 1 or 0, indicating that a facial image is or is not identified as a selfie. In some implementations, one or more of the techniques output a selfie probability, which is a value between 0 and 1, and the selfie probability is used for the feature vectors 1108. In general, only images that are identified as selfies by at least one technique are processed further, but in this illustration, feature vectors 1108-2, 1108-5, 1108-6, and 1108-7 are shown for completeness. These vectors have all zeros because the corresponding images were not identified as selfies by any of the techniques.

Feature vector 1108-8 has all 1's because facial image F.8 was identified as a selfie by all three of the techniques. Feature vectors 1108-3 and 1108-4 correspond to facial images F.3 (306-3) and F.4 (306-4). These images were identified as selfies by at least one technique, but not identified as selfies by one or more other techniques. In some implementations (not shown), a simple majority vote of the techniques is used to combine the selfie estimations. With a simple majority vote, facial images F.1, F.3, and F.8 are identified as selfies, but image F.4 is not included because it received only one out of three votes.

In some implementations, the feature vectors 1108 are used as input to a trained classifier 1110 (e.g., the machine learning module 224). The classifier is previously trained using a sample of users and their corresponding photos. In some implementations, a sample of 100 people is adequate to train the classifier 1110, but in some implementations, a larger or smaller sample is used (e.g., 50 people or 500 people). The classifier 1110 evaluates (1112) each input vector 1108 to compute an estimate 1114. In this illustration, estimates 1114-1, 1114-3, and 1114-8 indicate selfies (corresponding to images F.1, F.3, and F.8), and estimate 1114-4 indicates that image F.4 is not believed to be a selfie. In practice, estimates 1114-2, 1114-5, 1114-6 and 1114-7 would not be computed because the input vectors are all zeros. By combining multiple techniques in this way, there is greater confidence in the estimates of which photos are selfies.

FIG. 12 illustrates combining techniques in a way that is sometimes referred to as late fusion. In this example, each of the techniques is applied to estimate the demographic characteristics of the user. In the end, the results of all the techniques are combined, commonly using a weighted average. In this example, each of the other techniques described above is applied, but some implementations use fewer than all of these techniques.

As illustrated above in FIGS. 4, 5, 6, 7A/7B, and 8A/8B, there are various techniques for identifying selfie images. Once a set of selfie images is identified, the image may be evaluated to estimate demographic characteristics. In this example, the first technique estimates that the user is a 27 year old male (1202-1), the second technique estimates that the user is a 25 year old male (1202-2), the third technique estimates that the user is a 27 year old female (1202-3), the fourth technique estimates that the user is a 30 year old male (1202-4), and the fifth technique estimates that the user is a 28 year old male (1202-5). In this example, these are the five estimation techniques based on identifying selfie images. In some implementations, these techniques (or a subset thereof) can be combined as illustrated in FIG. 11.

In addition to the techniques using selfies, some implementations include one or more techniques that do not specifically identify selfie images. For example, FIG. 9 above illustrated a technique using visual concepts, and FIG. 10 illustrated a holistic approach using all of the facial images. Each of these techniques can be applied to estimate the user's demographic characteristics 1202-6 and 1202-7.

Finally, the results of the individual estimates 1202 are combined (1204) to produce a final estimate 1206. In this example, the user is estimated to be a 27 year old male. The combining may be performed using a weighted average of the individual estimates. The estimates may be weighted based on the historical accuracy of each technique. In some implementations, the individual estimates 1202 are used as a feature vector for input to a trained classifier, and the classifier computes the final estimate. The classifier typically uses a machine learning method, such as a support vector machine or a neural network.

Figure 13:
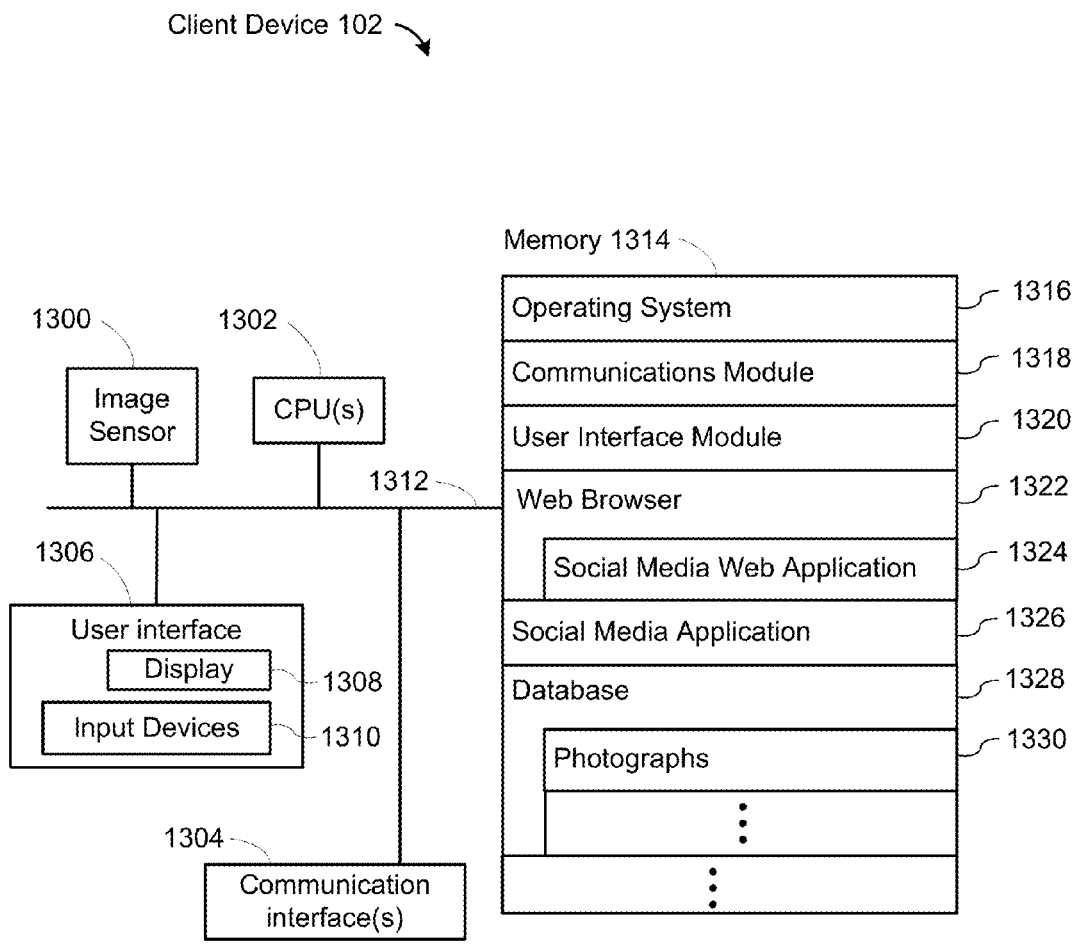
FIG. 13 is a block diagram illustrating a client device in accordance with some implementations.

FIG. 13 is a block diagram illustrating a client device 102, according to some implementations. The client device 102 can be a desktop computer, a laptop computer, a mobile device, or any other computing device with access to a social media site 110. The client device 100 typically includes one or more processing units (CPU's) 1302, one or more network or other communications interfaces 1304, memory 1314, and one or more communication buses 1312 for interconnecting these components. The communication buses 1312 may include circuitry (sometimes called a chipset) that interconnects and controls communications between system components. The client device 102 includes a user interface 1306 comprising a display device 1308 and input devices/mechanisms 1310 (e.g., a keyboard, a mouse, a touch screen, physical buttons, etc.). In some instances, the client device also includes an image sensor 1300, which is used to capture photographs.

Memory 1314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

Memory 1314 may optionally include one or more storage devices remotely located from the CPU(s) 1302. Memory 1314, or alternately the non-volatile memory device(s) within memory 1314, comprises a computer readable storage medium. In some implementations, memory 1314 stores the following programs, modules and data structures, or a subset thereof:

- an operating system 1316, which includes procedures for handling various basic system services and for performing hardware dependent tasks;
- a communication module 1318, which is used for connecting the client device 102 to other computer systems via the one or more communication interfaces 1304 (wired or wireless) and one or more communication networks, such as the Internet, other wide area networks, local area networks, metropolitan area networks, and so on;
- a user interface module 1320, which receives commands from the user via the input devices 1310 and generates user interface objects in the display device 1308;
- a web browser 1322, which enables a user to access resources, web pages, and web applications over a communication network. In some instances a user 100 may access a social media site 110 using a social media web application 1324 that runs within the browser;
- a social media application 1326 that runs independently of the web browser 1322; and
- a database 1328. In some cases the database stores photographs 1330, which may have been captured by a image sensor 1300 on the client device 102.

Each of the above identified elements may be stored in one or more of the previously mentioned memory devices, and corresponds to a set of instructions for performing a function described above. The set of instructions can be executed by one or more processors (e.g., the CPU's 1302). The above identified modules or programs (i.e., sets of instructions) need not be implemented as separate software programs, procedures or modules, and thus various subsets of these modules may be combined or otherwise re-arranged in various implementations. In some implementations, memory 1314 may store a subset of the modules and data structures identified above. Furthermore, memory 1314 may store additional modules and data structures not described above.

Although FIG. 13 shows a client device 102, FIG. 13 is intended more as a functional description of the various features that may be present in a client device 102 than as a structural schematic of the implementations described herein. In some instances, functionality described above with respect to analytic server 104 may be performed by the client device 102, or the processing may be split between a client device 102 and an analytic server 104.

Figure 14A:
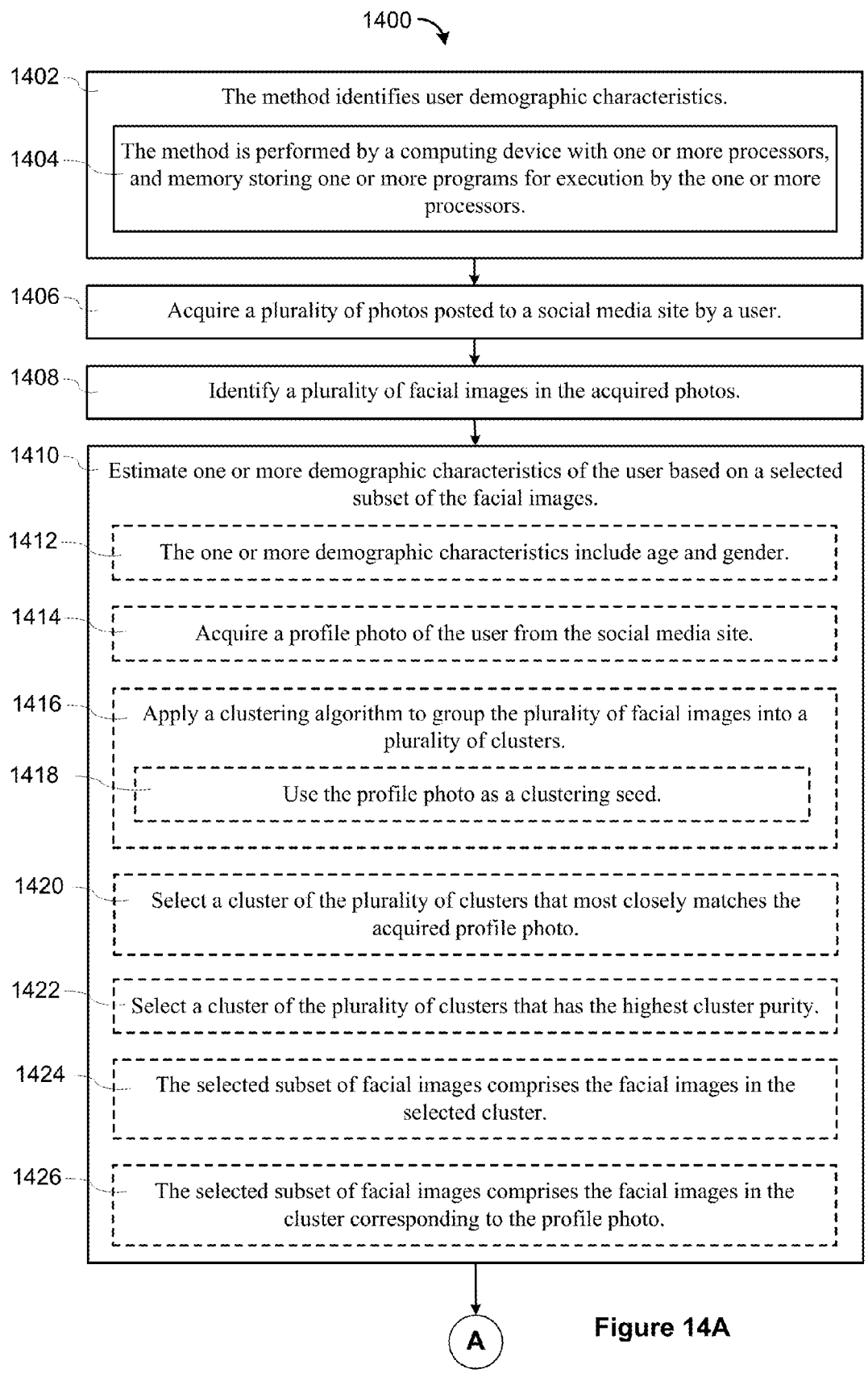
Figure 14B:
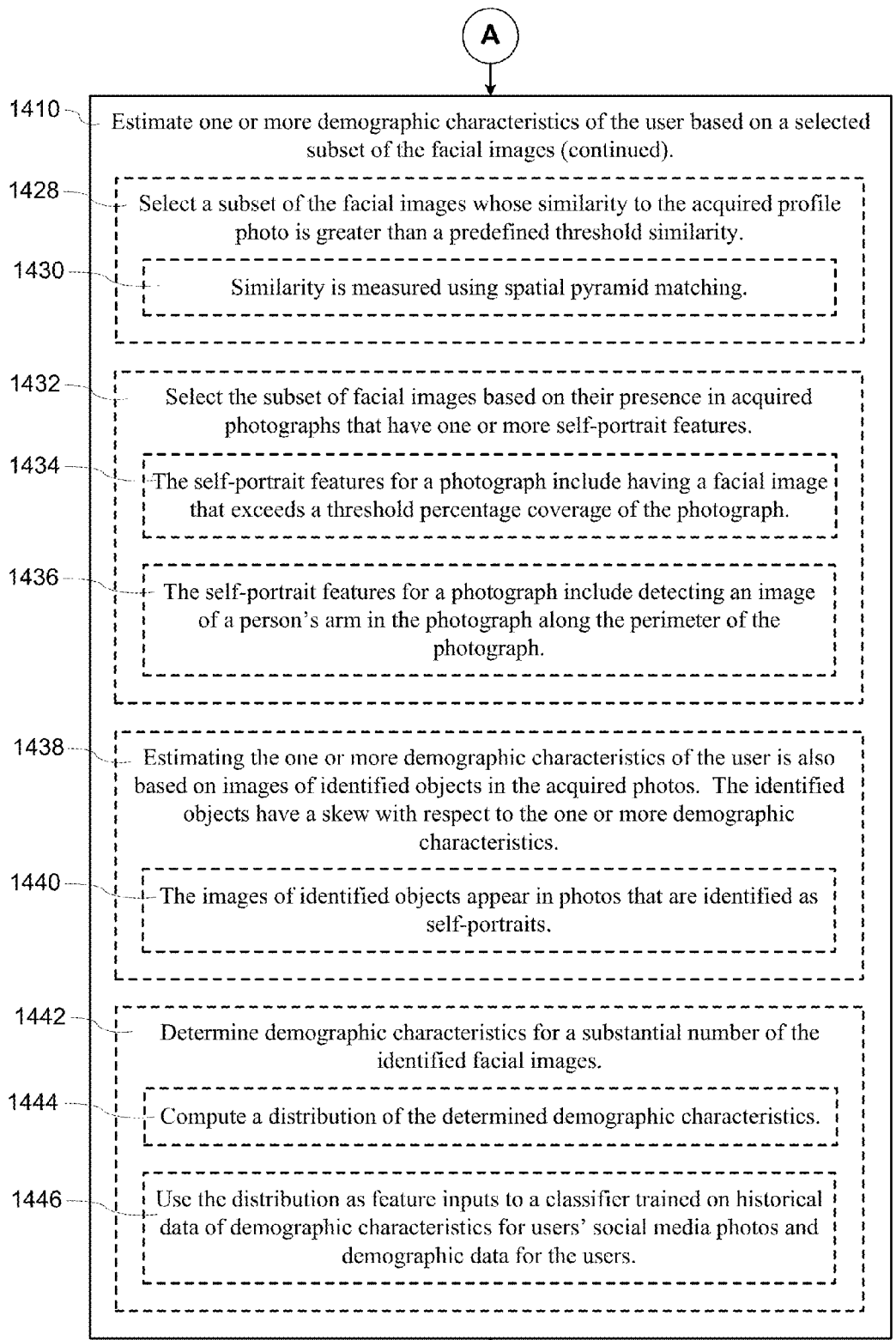

FIGS. 14A-14C illustrate a process 1400 for identifying (1402) user demographic characteristics, such as age and gender. The process is performed (1404) by a computing device, such as an analytic server 104 with one or more processors, and memory storing one or more programs for execution by the one or more processors.

The process 1400 acquires (1406) multiple photos 302 posted to a social media site 110 by a user 100. In some implementations, the photos 302 are acquired from two or more social media sites 110. In some implementations, one or more of the photos 302 are posted to the social media site 110 by other users and "tagged" as corresponding to the user 100. In some instances, the tagging process identifies a specific image in a photo that corresponds to the user 100. In some implementations, the tagged photos of a user 100 provide an additional method for estimating the demographic characteristics of the user 100.

The process identifies (1408) facial images in the acquired photos as illustrated above with respect to FIG. 3. Then, using processes illustrated in FIGS. 4-12, the process estimates (1410) one or more demographic characteristics of the user based on a selected subset of the facial images. In some implementations, the demographic characteristics include (1412) age and gender. In some implementations, the demographic characteristics include ethnicity.

In some implementations, the process acquires (1414) a profile photo 408 from the social media site 110. In some instances, the process acquires profile photos 408 for the user from two or more social media sites 110. In some instances, the profile photo 408 is acquired from a social media site different from the site where the photos 302 were acquired. In some implementations, the process applies (1416) a clustering algorithm to group the facial images into clusters, as illustrated above in FIGS. 4 and 5. In some of these implementations, the profile photo 408 (or photos) is used (1418) as a clustering seed, as illustrated in FIG. 5.

In some implementations, after the facial images are clustered, the process selects (1420) a cluster that most closely matches the acquired profile photo 408. This is illustrated above in step 406 in FIG. 4. In some implementations, a cluster is selected (1422) based on having the highest cluster purity (e.g., the images in the cluster are all "close" to each other). The use of cluster purity is described above with respect to FIGS. 7A and 7B. In some implementations, the selected cluster is used (1424) as the subset of facial images for estimating the demographic characteristics of the user. In some implementations where a profile photo 408 is used as a clustering seed, the cluster that contains the profile photo is used (1426) as the subset of images for determining the demographic characteristics of the user.

In some implementation, the subset of facial images used for estimating demographic characteristics is (1428) the set of images whose similarity to the acquired profile photo 408 is greater than a predefined threshold similarity. This is illustrated above with respect to FIG. 6. In some implementations, the similarity is measured (1430) using spatial pyramid matching.

In some implementations, the subset of facial images is selected (1432) based on the presence of the images in acquired photographs that have one or more self-portrait features. This is illustrated above with respect to FIGS. 8A and 8B, which provide two examples of self-portrait features. As illustrated in FIG. 8B, in some implementations the self-portrait features include (1434) having a facial image that exceeds a threshold percentage coverage of the photograph. As FIG. 8B illustrates, self-portraits commonly have a single large facial image 804. As illustrated in FIG. 8A, in some implementations the self-portrait features include (1436) detecting an image of a person's arm 802 in the photograph along the perimeter or periphery of the photograph.

In some implementations, estimating the demographic characteristics uses (1438) images of identified objects in the acquired photos, as illustrated above with respect to FIG. 9. The identified objects have (1438) a skew with respect to one or more of the demographic characteristics. Estimations based on identified objects provide greater confidence when multiple objects are identified that have similar skews (e.g., multiple objects that are more likely associated with a male user). The identified objects may appear in any of the acquired photos, and are not required to appear in the same photo. In some instances, the images of identified objects appear (1440) in photos that are identified as self-portraits.

Some implementations use another technique that is illustrated in FIG. 10. With this technique, the process 1400 determines (1442) demographic characteristics for a substantial number of the identified facial images. As explained above with respect to FIG. 10, a substantial number may be all of the images, more than a threshold percentage (e.g., more than 25% or more than 50%), or a statistically significant number (e.g., a sufficient number to estimate 90% confidence or 95% confidence with the results). Based on the determined demographic characteristics, the process 1400 constructs (1444) a distribution 1008 of the determined demographic characteristics. The distribution 1008 illustrated in FIG. 10 uses age and gender, with specific age ranges, but the distribution may use additional or different characteristics, or may split the ages into different ranges. As illustrated at the bottom of FIG. 10, some implementations use (1446) the distribution as feature inputs to a classifier trained on historical data of demographic characteristics for users' social media photos and demographic data for the users.

As illustrated in FIGS. 11 and 12, the various disclosed techniques for determining demographic characteristics of a user may be combined. In some implementations, the process 1400 applies (1448) N distinct evaluation methods to the facial images. Each method identifies (1448) a respective set of facial images that are estimated to be images of the user. N is an integer greater than 1. In some implementations, the process combines (1450) the identified respective sets of facial images to form a candidate set of facial images. For each (1452) facial image in the candidate set, some implementations form (1454) a respective N-dimensional feature vector. Each dimension of the respective feature vector corresponds to (1454) a unique one of the evaluation methods, and the values in the respective feature vector indicate (1454) which of the evaluation methods estimate the respective facial image to be an image of the user. The process 1400 uses (1456) the respective feature vector as input to a trained classifier to estimate whether the respective facial image is an image of the user. This is illustrated above in FIG. 11. The selected subset of the facial images includes (1458) facial images determined by the trained classifier to be images of the user.

In some implementations, a plurality of evaluation methods are applied (1460) to the facial images. Each method identifies (1460) a respective set of facial images that are estimated to be images of the user. The identified sets of facial images are combined (1462) to form a candidate set of facial images. The process then scores (1464) each facial image in the candidate set using a weighted average of scores provided by the evaluation methods. This is illustrated above in FIG. 12. The selected subset of the facial images includes (1466) facial images whose weighted average scores exceed a predefined threshold value.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, the various techniques illustrated above may be combined in various ways, which can result in higher accuracy of estimation or higher confidence for the estimations. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of identifying user demographic characteristics, comprising:
at a computing device with one or more processors, and memory storing one or more programs for execution by the one or more processors:
acquiring a plurality of photos posted to a social media site by a user;
identifying a plurality of facial images in the acquired photos;
inferring that each of a subset of the plurality of photos is a respective self-potrait taken by a respective person corresponding to a respective facial image in the respective photo, wherein each inference is based on a respective image of the respective person's arm along the perimeter of the respective photo;
selecting a subset of facial images from the plurality of facial images, including selecting one or more of the facial images based on their presence in one or more of the inferred self-portraits, wherein selecting the subset of facial images comprises:
applying a clustering algorithm to group the plurality of facial images into a plurality of clusters; and
selecting a cluster of the plurality of cluster that has a highest cluster purity;
wherein the selected subset of facial images comprises the facial images in the selected cluster; and
estimating one or more demographic characteristics of the user based on the selected subset of facial images.

2. The method of claim 1, wherein selecting the subset of facial images comprises:
acquiring a profile photo of the user from the social media site;
applying a clustering algorithm to group the plurality of facial images into a plurality of clusters; and
selecting a cluster of the plurality of clusters that most closely matches the acquired profile photo;
wherein the selected subset of facial images comprises the facial images in the selected cluster.

3. The method of claim 1, wherein selecting the subset of facial images comprises:
acquiring a profile photo of the user from the social media site; and
applying a clustering algorithm to group the plurality of facial images into a plurality of clusters, using the profile photo as a clustering seed;
wherein the selected subset of facial images comprises the facial images in the cluster corresponding to the profile photo.

4. The method of claim 1, wherein selecting the subset of facial images comprises:
acquiring a profile photo of the user from the social media site; and
selecting a subset of the facial images whose similarity to the acquired profile photo is greater than a predefined threshold similarity.

5. The method of claim 4, wherein similarity is measured using spatial pyramid matching.

6. The method of claim 1, wherein estimating the one or more demographic characteristics of the user further comprises:
determining demographic characteristics for a statistically significant percentage of the identified facial images;

computing a distribution of the determined demographic characteristics; and using the distribution as feature inputs to a classifier trained on historical data of demographic characteristics for users' social media photos and demographic data for the users.

7. The method of claim 1, wherein estimating the one or more demographic characteristics of the user comprises:
applying N distinct evaluation methods to the facial images, each method identifying a respective set of facial images that are estimated to be images of the user, wherein N is an integer greater than one;
combining the identified respective sets of facial images to form a candidate set of facial images; and
for each facial image in the candidate set:
forming a respective N-dimensional feature vector, wherein each dimension of the respective feature vector corresponds to a unique one of the evaluation methods, and the values in the respective feature vector indicate which of the evaluation methods estimate the respective facial image to be an image of the user; and
using the respective feature vector as input to a trained classifier to estimate whether the respective facial image is an image of the user;
wherein the selected subset of the facial images includes facial images determined by the trained classifier to be images of the user.

8. The method of claim 1, wherein estimating the one or more demographic characteristics of the user comprises:
applying a plurality of evaluation methods to the facial images, each method identifying a respective set of facial images that are estimated to be images of the user;
combining the identified respective sets of facial images to form a candidate set of facial images;
scoring each facial image in the candidate set using a weighted average of scores provided by the evaluation methods;
wherein the selected subset of the facial images includes facial images whose weighted average scores exceed a predefined threshold value.

9. The method of claim 1, wherein the one or more demographic characteristics include age and gender.

10. A computer system for identifying user demographic characteristics, comprising:
one or more processors;
memory; and
one or more programs stored in the memory, the one or more programs comprising instructions for:
acquiring a plurality of photos posted to a social media site by a user;
identifying a plurality of facial images in the acquired photos;
inferring that each of a subset of the plurality of photos is a respective self-portrait taken by a respective person corresponding to a respective facial image in the respective photo, wherein each inference is based on a respective image of the respective person's arm along the perimeter of the respective photo and each inference is further based on the respective photo having a facial image that exceeds a threshold percentage coverage of the respective photo;
selecting a subset of facial images from the plurality of facial images, including selecting one or more of the facial images based on their presence in one or more of the inferred self-portraits; and
estimating one or more demographic characteristics of the user based on the selected subset of facial images.

11. The computer system of claim 10, wherein the instructions for selecting the subset of facial images further comprise instructions for:
acquiring a profile photo of the user from the social media site;
applying a clustering algorithm to group the plurality of facial images into a plurality of clusters; and
selecting a cluster of the plurality of clusters that most closely matches the acquired profile photo;
wherein the selected subset of facial images comprises the facial images in the selected cluster.

12. The computer system of claim 10, wherein the instructions for selecting the subset of facial images further comprise instructions for:
applying a clustering algorithm to group the plurality of facial images into a plurality of clusters; and
selecting a cluster of the plurality of clusters that has a highest cluster purity;
wherein the selected subset of facial images comprises the facial images in the selected cluster.

13. The computer system of claim 10, wherein the instructions for estimating the one or more demographic characteristics of the user further comprise instructions for:
determining demographic characteristics for a statistically significant percentage of the identified facial images;
computing a distribution of the determined demographic characteristics; and
using the distribution as feature inputs to a classifier trained on historical data of demographic characteristics for users' social media photos and demographic data for the users.

14. The computer system of claim 10, wherein selecting the subset of facial images comprises:
acquiring a profile photo of the user from the social media site; and
applying a clustering algorithm to group the plurality of facial images into a plurality of clusters, using the profile photo as a clustering seed;
wherein the selected subset of facial images comprises the facial images in the cluster corresponding to the profile photo.

15. The computer system of claim 10, wherein selecting the subset of facial images comprises:
acquiring a profile photo of the user from the social media site; and
selecting a subset of the facial images whose similarity to the acquired profile photo is greater than a predefined threshold similarity.

16. A non-transitory computer readable storage medium storing one or more programs configured for execution by a computer with an image sensor, the one or more programs comprising instructions for:
acquiring a plurality of photos posted to a social media site by a user;
identifying a plurality of facial images in the acquired photos;
inferring that each of a subset of the plurality of photos is a respective self-portrait taken by a respective person corresponding to a respective facial image in the respective photo, wherein each inference is based on a respective image of the respective person's arm along the perimeter of the respective photo;
selecting a subset of facial images from the plurality of facial images, including selecting one or more of the facial images based on their presence in one or more of the inferred self-portraits; and estimating one or more demographic characteristics of the user based on the selected subset of facial images and based on images of identified non-human background objects in the scenes of the acquired photos, wherein the identified non-human background objects have a skew with respect to the one or more demographic characteristics.

17. The computer readable storage medium of claim 16, wherein the instructions for selecting the subset of facial images further comprise instructions for:

acquiring a profile photo of the user from the social media site; and applying a clustering algorithm to group the plurality of facial images into a plurality of clusters, using the profile photo as a clustering seed;

wherein the selected subset of facial images comprises the facial images in the cluster corresponding to the profile photo.

18. The computer readable storage medium of claim 16, wherein the images of identified objects appear in photos that are identified as self-portraits.

19. The computer readable storage medium of claim 16, wherein the instructions for selecting the subset of facial images further comprise instructions for:

acquiring a profile photo of the user from the social media site;

applying a clustering algorithm to group the plurality of facial images into a plurality of clusters; and selecting a cluster of the plurality of clusters that most closely matches the acquired profile photo;

wherein the selected subset of facial images comprises the facial images in the selected clusters.

20. The computer readable storage medium of claim 16, wherein the instructions for estimating the one or more demographic characteristics of the user further comprise instructions for:

determining demographic characteristics for a statistically significant percentage of the identified facial images;

computing a distribution of the determined demographic characteristics; and using the distribution as feature inputs to a classifier trained on historical data of demographic characteristics for users' social media photos and demographic data for the users.

* * * * *